(12) United States Patent
Hair

(10) Patent No.: US 8,943,314 B2
(45) Date of Patent: Jan. 27, 2015

(54) SYSTEM AND METHOD FOR MANIPULATING A COMPUTER FILE AND/OR PROGRAM

(75) Inventor: Arthur R. Hair, Upper St. Clair, PA (US)

(73) Assignee: DMT Licensing, LLC, Princeton, NJ (US)

( * ) Notice: Subject to any disclaimer, the term of this patent is extended or adjusted under 35 U.S.C. 154(b) by 0 days.

(21) Appl. No.: 12/590,109

(22) Filed: Nov. 3, 2009

(65) Prior Publication Data

US 2010/0058055 A1    Mar. 4, 2010

Related U.S. Application Data

(63) Continuation of application No. 10/632,166, filed on Jul. 29, 2003, now Pat. No. 7,617,392, which is a continuation of application No. 09/256,432, filed on Feb. 23, 1999, now Pat. No. 6,615,349.

(51) Int. Cl.
*H04L 29/06*    (2006.01)
*G06F 21/62*    (2013.01)

(52) U.S. Cl.
CPC ............ *G06F 21/62* (2013.01); *G06F 21/6209* (2013.01)
USPC ............................ 713/165; 713/153; 713/168

(58) Field of Classification Search
None
See application file for complete search history.

(56) References Cited

U.S. PATENT DOCUMENTS 6,219,669 B1 *   4/2001   Haff et al. ............................. 1/1

OTHER PUBLICATIONS

3Com, "ReachOut Remote Control Host User's Guide", Jun. 1996, 3Com, pp. 1-63.*
3Com, "ReachOut Remote Control Viewer User's Guide", May 1996, 3Com, pp. 1-57.*

* cited by examiner

*Primary Examiner* — Benjamin Lanier
(74) *Attorney, Agent, or Firm* — Ansel M. Schwartz

(57) ABSTRACT

A device for manipulating a computer file or program includes a processor. The device includes a network interface which receives commands. The device includes a receiver which receives the commands from the network interface and provides the commands to the processor. The device includes storage having a computer file or program in a memory. Wherein the processor, based on the commands, makes changes to the computer file or program in the memory and suspends and reestablishes user intervention to the computer file or program. A device for manipulating a computer file or program.

14 Claims, 12 Drawing Sheets

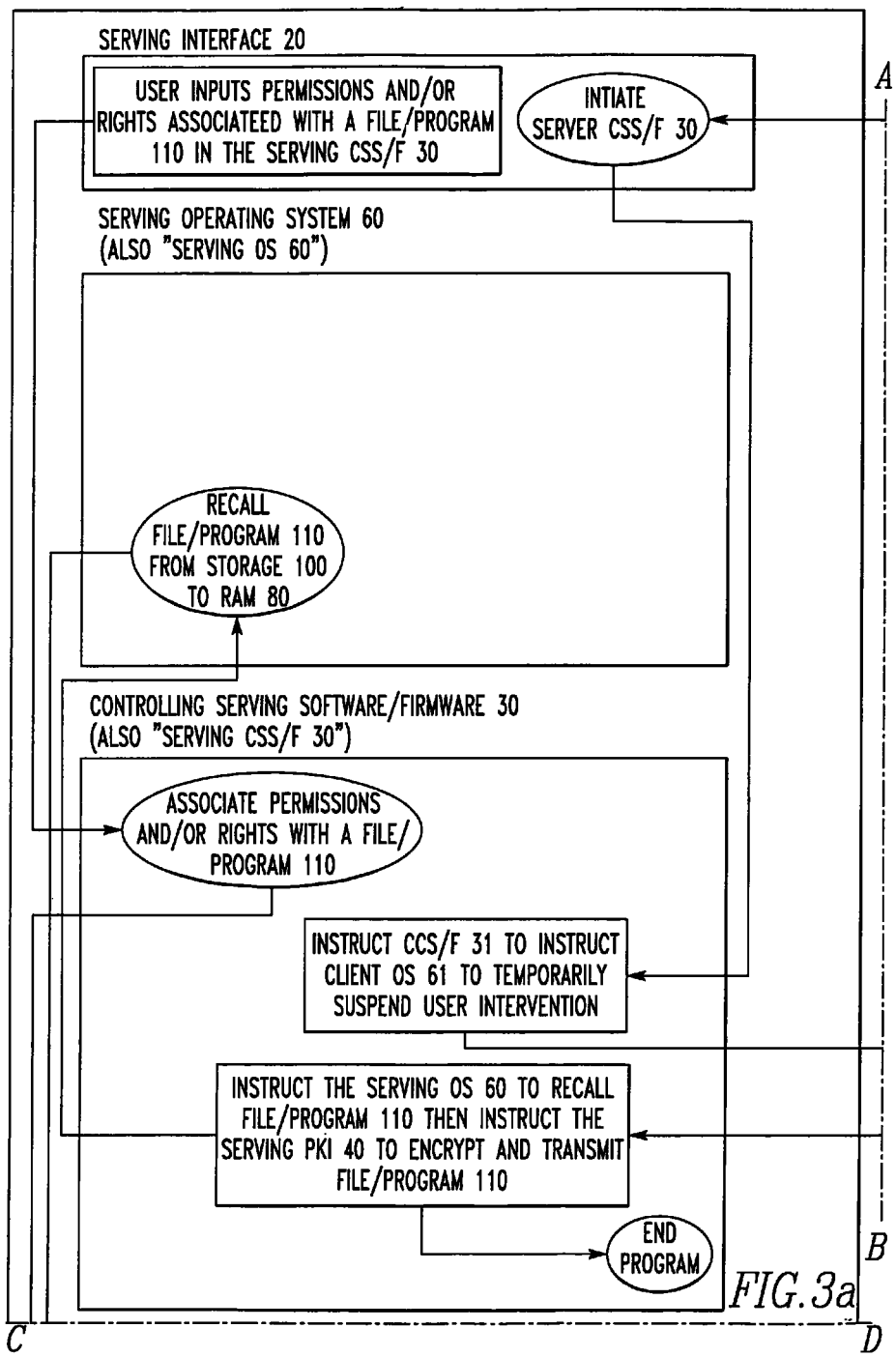

*FIG.4c*

NEXT CLIENT DEVICE 12

NEXT CLIENT INTERFACE 22

NEXT CLIENT OPERATING SYSTEM 62
(ALSO "NEXT CLIENT OS 62")

RESTORE USER INTERVENTION

SUSPEND USER INTERVENTION

INSTRUCT NEXT CLIENT CCS/F 32 TO CONTINUE

CONTROLLING CLIENT SOFTWARE/FIRMWARE 32
(ALSO "NEXT CLIENT CSS/F 32")

END PROGRAM

INSTRUCT NEXT CLIENT OS 62 TO ERASE RAM 82 AND RESTORE USER INTERVENTION

A

INSTRUCT NEXT CLIENT OS 62 TO TEMPORARILY SUSPEND USER INTERVENTION

INSTRUCT CLIENT CCS/F 31 TO TRANSMIT FILE/PROGRAM 110

B

INSTRUCT CLIENT CCS/F 31 TO CONTINUE

INSTRUCT NEXT CLIENT EFS 42 TO ENCRYPT FILE/PROGRAM 110 AND SAVE IN STORAGE 102 AND ERASE FILE/PROGRAM 110 FROM RAM 82

E

F

SYSTEM AND METHOD FOR MANIPULATING A COMPUTER FILE AND/OR PROGRAM

CROSS-REFERENCE TO RELATED APPLICATIONS

This is a continuation application of U.S. patent application Ser. No. 10/632,166 filed Jul. 29, 2003 now U.S. Pat. No. 7617392, which is a continuation application of U.S. patent application Ser. No. 09/256,432 filed Feb. 23, 1999, now U.S. Pat. No. 6,615,349 issued Sep. 2, 2003.

FIELD OF THE INVENTION

The present invention is related to a method and system to automatically invoke functionality of an operating system during the encrypted transmission and encrypted storage of computer files and/or computer programs from one computing device to another computing device.

BACKGROUND OF THE INVENTION

The secure transmission of computer files via communication means has increased in importance with the proliferation of the Internet for electronic distribution and electronic commerce. The fundamental shift from physical delivery of computer files and/or computer programs to digital based electronic transmission has commenced with the Internet emerging as a ubiquitous low cost network. As in previous technological advancements such as the transition from newspaper to radio and then to television, media companies of the time were forced to react to the emergence of these new mediums. However, unlike previous technological transitions, the Internet as a medium supports all of the functionality of the traditional print, radio and television industries while simultaneously supporting electronic commerce as well. Currently, many businesses utilize the Internet to sell or give away their computer files and/or computer programs via the Internet and in most cases, the computer files are not encrypted for protection against piracy or illegal use. Additionally, the current approach relating to the secure transmission and storage of computer files fails to leverage encryption functionality of a computing device's operating system. The current approach calls for a computing device acting as a server (the "Serving Device") to communicate with another computing device acting as a client (the "Client Device") to transfer encrypted files for decryption at the application level (such as, but not limited to, Win32 Application) of the Client Device. The Client Device utilizes a computer program running at the application level for decryption, which is assigned a unique decryption "key." During the transmission process, the Serving Device encrypts the computer file for storage using the decryption "key" of the Client Device. The encrypted computer file is then transmitted via the Internet and saved into storage within, or connected to, the Client Device. After decryption of the computer file, the decrypting computer program transmits a decrypted signal to the operating system for display or, in the case of an audio file, playback through the sound card. The decrypted signal can be vulnerable when transmitted from the decrypting application to the operating system, and the signal can be intercepted, possibly resulting in the illegal duplication of the computer file.

Addressing certain aspects of computer file and computer program encryption, the Microsoft Corporation published in 1998, a white paper titled "Microsoft Windows NT version 5.0, Public Key Infrastructure", incorporated by reference herein, (hereinafter the "Windows 2000 PKI White Paper"), detailing encryption functionality of a comprehensive public key infrastructure (PKI) in the Windows 2000 family of operating systems (formerly referred to as Windows NT 5.0). The Windows 2000 PKI White Paper stated on the cover page thereof, "Microsoft® Windows NT® version 5.0 introduces a comprehensive public key infrastructure (PKI) to the Windows® platform. This utilizes and extends the Windows-based public key (PK) cryptographic services introduced over the past few years, providing an integrated set of services and administrative tools for creating, deploying, and managing PK-based applications. This allows application developers to take advantage of the shared-secret security mechanisms or PK-based security mechanism in Windows NT as appropriate. At the same time, enterprises gain the advantage of being able to manage the environment and applications based on consistent tools and policy mechanisms."

Furthermore, and with special emphasis on the encryption functionality of the Public Key Infrastructure of the Windows 2000 family of operating systems, the Windows PKI White Paper stated, "The Web has rapidly become a key element in creating and deploying solutions for the effective exchange of information on a worldwide basis. In particular, growth in its use for business purposes has been dramatic. For many uses, security is a key consideration. Notably: Server authentication—To enable clients to verify the server they are communicating with. Client authentication—To allow servers to verify the client's identity and use this as a basis for access control decisions. Confidentiality—Encryption of data between clients and servers to prevent its exposure over public Internet links.

The Secure Sockets Layer (SSL) and the emerging IETF standard Transport Layer Security (TLS) protocols play an important role in addressing these needs. SSL and TLS are flexible security protocols that can be layered on top of other transport protocols. They rely on PK-based authentication technology and use PK-based key negotiation to generate a unique encryption key for each client and/or server session. They are most commonly associated with Web-based applications and the HTTP protocol (referred to as HTTPS).

SSL and TLS are supported on the Windows platform by the secure channel (schannel) SSPI provider. Microsoft Internet Explorer and Internet Information Services both use schannel for this functionality. Because schannel is integrated with Microsoft's SSPI architecture, it is available for use with multiple protocols to support authenticated and/or encrypted communications.

Taking full advantage of the SSL and TLS protocols requires both clients and servers to have identification certificates issued by mutually trusted CAs, allowing the parties to authenticate each other. In this mode, certificates are exchanged along with data that proves possession of the corresponding private key. Each side can then validate the certificate and verify possession of the private key using the certificate's public key. The identifying information included in the certificate can then be used to make supplemental access control decisions. For example, the client can decide whether the server is someone it wishes to conduct business with and the server can decide what data the client will be allowed access.

The Windows NT 5.0 PKI integrates support for the latter decisions as a standard feature of Windows NT Server. User certificates can be mapped on a one-to-one or many-to-one basis against security principals (User objects) in the Active Directory. Schannel can take advantage of this information to automatically synthesize a security token for the client such that the Windows NT ACL mechanisms are used to enforce access control to resources. This is advantageous for services in that they can utilize the identical access control mechanism independent of the client authentication mechanism used (PK or Kerberos).

Once the client and server have authenticated each other, they can proceed to negotiate a session key and begin communicating securely. SSL and TLS are also often employed in a mode that doesn't require client authentication. Use of mutual authentication is recommended in the enterprise environment, however, because it allows you to make use of the Windows-based access control mechanisms. Also, the PKI significantly simplifies certificate enrollment and management, reducing the burden on the client."

In another white paper published by the Microsoft Corporation in September 1998, titled "Windows NT Workstation 5.0 Key Benefits and Capabilities Whitepaper", incorporated by reference herein, (the "Windows 2000 Workstation White Paper") Microsoft provides additional detail on encryption functionality of the Windows 2000 family of operating systems. The Windows 2000 Workstation White Paper stated on page 30 thereof, "Windows NT Workstation 5.0 provides support for Public Key security, an industry-standard authentication protocol used over public networks, such as the Internet. The most important use of Public Keys is for digital signatures, which assure authenticity of components, including that: E-mail came from the sender; E-mail cannot be viewed or edited by other users; Applications and drivers come from known sources; Software is protected from tampering after installation; The identity of a remote computer is guaranteed; Secure Internet communication is allowed; Strong encryption is allowed, such as that needed for secure transactions.

While other platforms, such as any Windows platform running Internet Explorer 4.0, support the use of Public Keys, Windows NT Workstation 5.0 goes further by providing a more robust infrastructure for creating certificates, "trusts" with other systems, and secure storage for certificates."

The Windows 2000 Workstation White Paper expands on secure virtual private network services, stating on page 31 thereof, "In addition to PPTP, today's most common method, Windows NT Workstation 5.0 supports several new, more secure methods of creating Virtual Private Networks, including: L2TP (Layer 2 Tunneling Protocol), a more secure version of PPTP, for tunneling, address assignment, and authentication; IPSEC (IP Security Protocol), a standard-based protocol that provides the highest levels of VPN security. With IPSEC, virtually everything above the networking layer can be encrypted. This provides end-to-end privacy, integrity, and authenticity over public networks. The IPSEC method is transparent to applications and protocols. Microsoft is working closely with vendors to support hardware acceleration for IPSEC through NDIS interfaces.

Windows NT Workstation 5.0 also provides an enhanced Network Connections dialog that makes it easier for users to create VPNs (see the "Simplicity" section)."

Additionally, Microsoft discusses storage encryption functionality within the Windows 2000 family of operating systems in the Windows 2000 PKI White Paper, describing an encrypting file system (EFS) which resides in the Windows 2000 kernel. Microsoft states in the Windows 2000 PKI White Paper on pages 21 and 22 thereof, "The Windows NT 5.0 Encrypting File System (EFS) supports transparent encryption and decryption of files stored on a disk in the Windows NT file system (NTFS). The user can designate individual files to encrypt, or folders whose contents are to be maintained in encrypted form. Applications have access to a user's encrypted files in the same manner as unencrypted files. However, they will be unable to decrypt any other user's encrypted files.

EFS makes extensive use of PK-based technology to provide mechanisms for encrypting files to multiple users and well as supporting file recovery. To do this, it utilizes the ability of PK to support bulk encryption without prior shared secrets. In operation, each EFS user generates a public key pair and obtains an EFS certificate. The certificate will be issued by an enterprise CA in the Windows NT 5.0 domain, although EFS will generate a self-signed certificate for stand-alone operation where data sharing is not an issue. In addition, Windows NT 5.0 supports an EFS recovery policy in which trusted recovery agents can be designated. These agents generate an EFS recovery public key pair and will be issued an EFS recovery certificate by the enterprise CA. The certificates of the EFS recovery agents are published to domain clients with the Group Policy Object.

In operation, for each file to be encrypted EFS creates a random key that is used to encrypt the file. The user's EFS public key is then used to encrypt this secret key and associate it with the file. In addition, a copy of the secret key, encrypted with each recovery agent's EFS public key, is associated with the file. No plaintext copy of the secret key is stored in the system.

When retrieving the file, EFS transparently unwraps the copy of the secret key encrypted with the user's public key using the user's private key. This is then used to decrypt the file in real time during file read and write operations. Similarly, a recovery agent may decrypt the file by using the private key to access the secret key."

Providing additional detail on the level of security of Microsoft's Encrypting File System, the Windows 2000 Workstation White Paper states on page 28 thereof, "An Encrypted File System (EFS) encrypts files on a hard disk. Each file is encrypted using a randomly generated key, which is independent of the users' public and/or private key pair. EFS resides in the Windows NT kernel and uses the non-paged pool to store file encryption keys, ensuring that they never reach the paging file. EFS is supported on a file or directory basis. Encryption and decryption is transparent to the user."

The instability of computing functions (such as, but not limited to, functions resulting in computing system crashes) is generally regarded as greater at the application level than at the operating system level. The closer the computing functions are to the core of the operating system, the more stable they are generally. If an application level decryption program becomes damaged or corrupted and reinstallation of another decryption program is required, a new "decryption key" is generated and the previously encrypted computer files, being encrypted to the old "decryption key," cannot be decrypted by the newly installed decryption program. Avoiding the encryption and/or decryption weaknesses inherent in application level programs, Microsoft has taken steps to protect lost "encryption and/or decryption keys" in the Windows 2000 PKI. Microsoft stated in the Windows 2000 PKI White Paper on page 14 thereof, "Public key pairs and certificates tend to have high value. If they are lost due to system failure, their replacement may be time consuming and result in monetary loss. To address these issues, the Windows NT 5.0 PKI supports the ability to back up and restore both certificates and associated key pairs through the certificate-management administrative tools."

SUMMARY OF THE INVENTION

The present invention offers a new and improved method and system to automatically invoke certain functionality of a public key infrastructure and encrypting file system of operating systems to encrypt computer files or computer programs for electronic transmission between computing devices and encrypt those computer files or computer programs for subsequent storage, and restrict usage permissions and/or rights. The present invention instructs the operating systems of the computing devices to temporarily suspend user intervention until completion of the encrypted transmission and encrypted storage process to prevent unauthorized use of replication of the computer files or computer programs. The present invention instructs the public key infrastructure of a serving device to encrypt for transmission a computer file or computer program (and any accompanying permissions and/or rights established by the serving device) stored within, or connected to, the serving device then transmit said computer file or computer program to the client device. Upon receipt by the client device of said computer file or computer program (and any accompanying permissions and/or rights established by the serving device), the present invention automatically instructs the public key infrastructure of the client device to decrypt from transmission said computer file or computer program (and any accompanying permissions and/or rights established by the serving device) transmitted by the serving device. The present invention then instructs the encrypting file system of the client device to encrypt for storage, based on any permissions and/or rights as established by the serving device and which accompanied the computer file or computer program, and store the computer file or computer program. The present invention separates the storage encryption process from the transmission encryption process to enable encrypted transmission between computing devices running different operating systems, using industry standard communication protocols, then having the different operating systems execute their unique or proprietary storage encryption process. Furthermore, the most widely used operating systems support the encrypted transmission standards of the Internet, however, standards do not exist for operating system based encrypted storage. A unique benefit of the present invention is that it utilizes multiple encryption and/or decryption processes to provide an end-to-end solution for the encrypted transfer and storage of computer files and/or programs between computers running different operating systems. Instead of permanently encrypting a computer file and/or program for use on one specific decrypting device or computer, the present invention assigns permissions and/or rights to the computer file and/or program then tasks the encryption functionality of operating system possessing the computer file and/or program to enforce the permissions and/or rights. In this way, flexible permissions and/or rights can be assigned to the computer file and/or program which follow it from computer to computer, from operating system to operating system, while being encrypted and decrypted, as necessary, along the way.

The present invention also offers a new and improved method and system to activate certain functionality of a public key infrastructure and encrypting file system of the client device to execute any permissions and/or rights which accompanied a given computer file or computer program. Permissions and/or rights (such as but not limited to number of plays, print outs, views, uses, copies, moves, relocations, time duration of use, number of users, etc.) will then be enforced by the encrypting file system in conjunction with the present invention. As example, a computer file or computer program received by a client device could be accompanied with the permission or rights, as established by the serving device, allowing the user of the client device to move said computer file or computer program to another computing device (the "next client device"). In this example, the present invention would instruct the operating systems of the client device and the next client device to prevent user intervention until completion of the move. The present invention instructs the encrypting file system of the client device to decrypt said computer file or computer program. Then the present invention instructs the public key infrastructure of the client device to encrypt for transmission said computer file or computer program (and the permissions and/or rights established by the serving device), then transmit via communication means the computer file or computer program to the next client device. Upon receipt by the next client device of said computer file or computer program (and the permissions and/or rights established by the serving device), the present invention automatically instructs the public key infrastructure of the next client device to decrypt from transmission said computer file or computer program (and the permissions and/or rights established by the serving device) transmitted by the client device. The present invention then instructs the encrypting file system of the next client device to encrypt for storage based on the permissions and/or rights established by the serving device which accompanied said computer file or computer program during transmission from the client device, and store said computer file or computer program.

The present invention pertains to a system for manipulating a computer file and/or program. The system comprises a serving device having access to a computer file and/or program which is unencrypted and which can encrypt the unencrypted computer file and/or program to become an encrypted computer file and/or program and transfer it. The system comprises a connector connected to the serving device on which the encrypted computer file and/or program travels and to which the serving device transfers the encrypted computer file and/or program. The system comprises a client device which receives the encrypted computer file and/or program and decrypts the encrypted computer file and/or program back to the unencrypted computer file and/or program. The client device does not allow intervention to the encrypted computer file and/or program during a time when the encrypted computer and/or file program is received. The serving device is separate, apart and distinct from the client device.

The present invention pertains to a method for manipulating a computer file and/or program. The method comprises the steps of suspending intervention by a user at a client device of the client device. Then there is the step of encrypting an unencrypted computer file and/or program at the server device to form an encrypted computer file and/or program. Next there is the step of transferring the encrypted computer file and/or program to the client device along a connector connected to the client device and the server device. Then there is the step of reestablishing the intervention of the client device by the user.

BRIEF DESCRIPTION OF THE DRAWINGS

In the accompanying drawings, the preferred embodiment of the invention and preferred methods of practicing the invention are illustrated in which:

FIG. 1 is a schematic diagram which may also be used in carrying out the teachings of this invention for the purpose of automatically invoking functionality of the Operating System 61 of the Client Device 11 to: receive and decrypt a Computer File and/or Program 110, and its associated permissions and/or rights, from transmission from a Serving Device 10 through use of a Transceiver 71 connected to a Communication Means 120 and store an electronic copy thereof in RAM 81; encrypt and save said Computer File and/or Program 110 from RAM 81 to Storage 101 using said associated permissions and/or rights, and then erase any electronic copies of said Computer File and/or Program 110 from RAM 81; FIG. 2 is a schematic diagram which may also be used in carrying out the teachings of this invention for the purposes of automatically invoking functionality of the Operating System 62 of the Client Device 12 to: receive and decrypt a Computer File and/or Program 110, and its associated permissions and/or rights, from transmission from a Client Device 11 through use of a Transceiver 72 connected to a Communication Means 120 and store an electronic copy thereof in RAM 82; encrypt and save said Computer File and/or Program 110 from RAM 82 to Storage 102 using said associated permissions and/or rights, and then erase any electronic copies of said Computer File and/or Program 110 from RAM 82; FIG. 3 is a computer programming flowchart which may also be used in carrying out the teachings of this invention for the purpose of automatically invoking functionality of the Operating System 61 of the Client Device 11 to: receive and decrypt a Computer File and/or Program 110, and its associated permissions and/or rights, from transmission from a Serving Device 10 through use of a Transceiver 71 connected to a Communication Means 120 and store an electronic copy thereof in RAM 81; encrypt and save said Computer File and/or Program 110 from RAM 81 to Storage 101 using said associated permissions and/or rights, and then erase any electronic copies of said Computer File and/or Program 110 from RAM 81; FIG. 4 is a computer programming flowchart which may also be used in carrying out the teachings of this invention for the purposes of automatically invoking functionality of the Operating System 62 of the Client Device 12 to: receive and decrypt a Computer File and/or Program 110, and its associated permissions and/or rights, from transmission from a Client Device 11 through use of a Transceiver 72 connected to a Communication Means 120 and store an electronic copy thereof in RAM 82; encrypt and save said Computer File and/or Program 110 from RAM 82 to Storage 102 using said associated permissions and/or rights, and then erase any electronic copies of said Computer File and/or Program 110 from RAM 82.

DETAILED DESCRIPTION

Figure 1A:
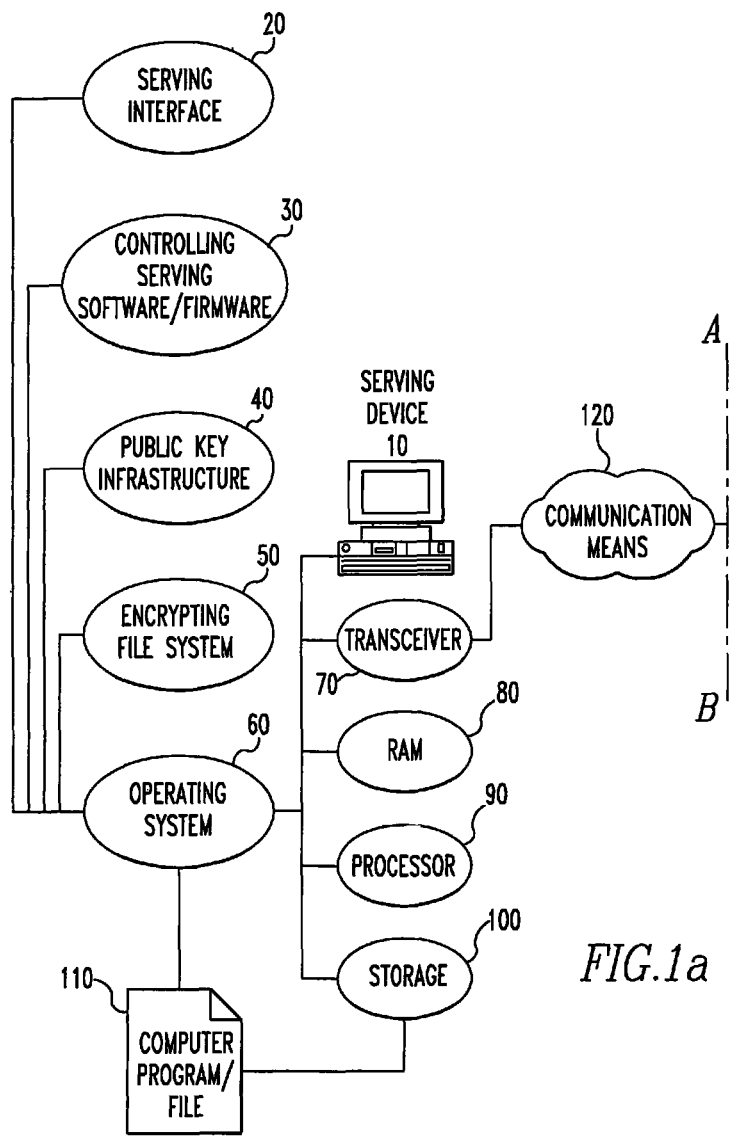
FIG. 1 is a schematic diagram which may be used in carrying out the teachings of this invention for the purpose of automatically invoking functionality of the Operating System 60 of the Serving Device 10 to: encrypt and transmit a Computer File and/or Program 110, and its associated permissions and/or rights, to a Client Device 11 through use of a Transceiver 70 connected to a Communication Means 120.
Figure 1B:
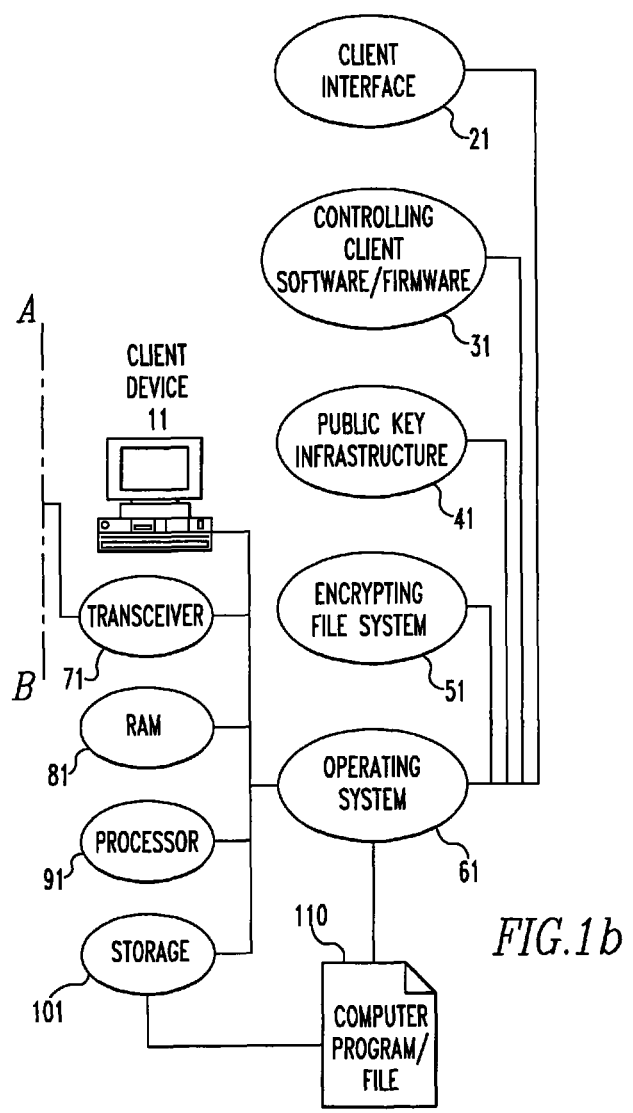
Figure 2A:
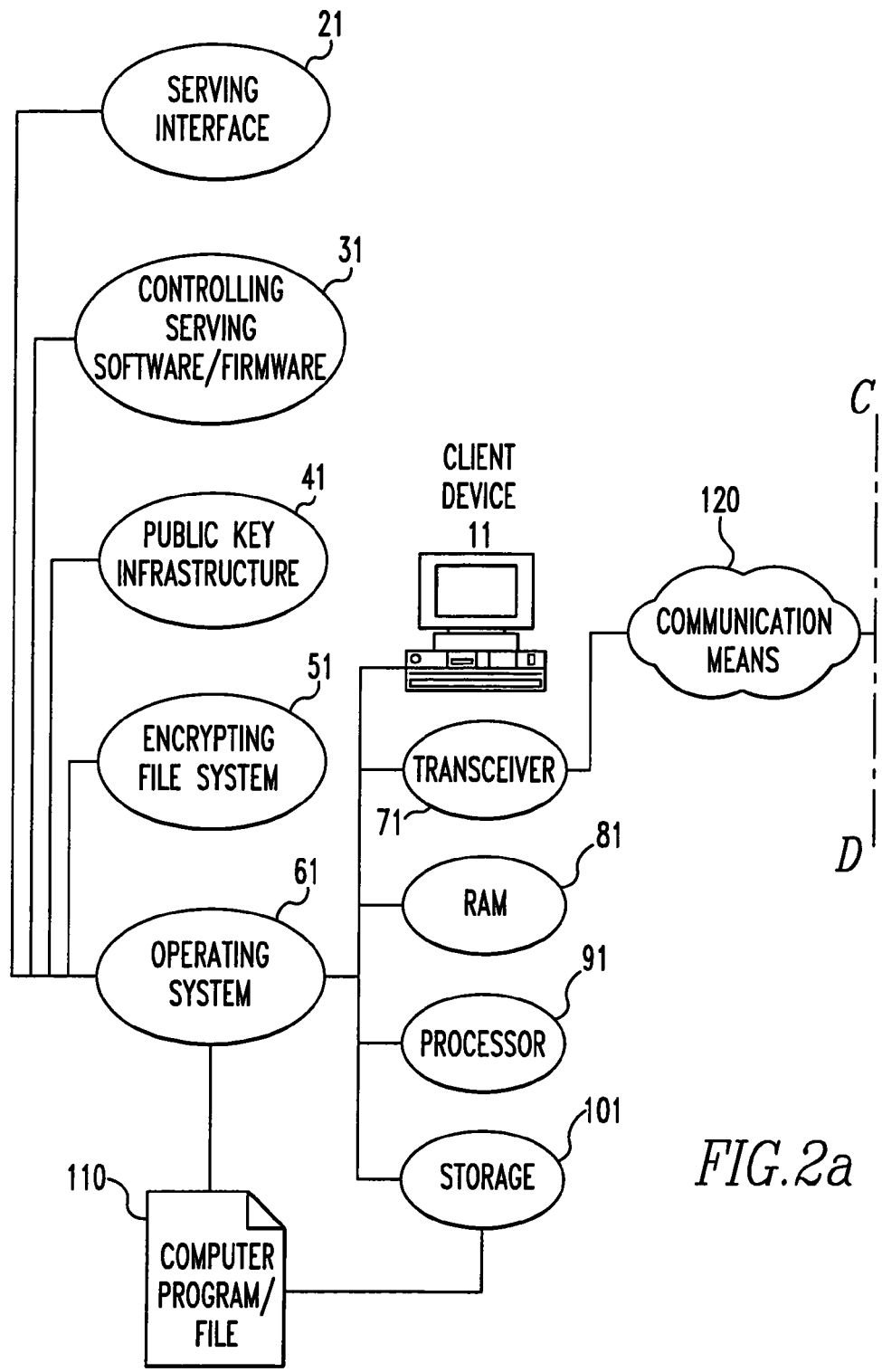
FIG. 2 is a schematic diagram which may be used in carrying out the teachings of this invention for the purposes of automatically invoking functionality of the Operating System 61 of the Client Device 11 to: decrypt a Computer File and/or Program 110 from Storage 101 and store an electronic copy thereof, and store the associated permissions and/or rights, in RAM 81; and encrypt and transmit a Computer File and/or Program 110, and its associated permissions and/or rights, to a Next Client Device 12 through use of a Transceiver 71 connected to a Communication Means 120; and then erase any electronic copies of said Computer File and/or Program 110 from RAM 81; and, in the case of a move of said Computer File and/or Program 110 from to Storage 101 to Storage 102, then erase any electronic copies of said Computer File and/or Program 110 from Storage 101.
Figure 2B:
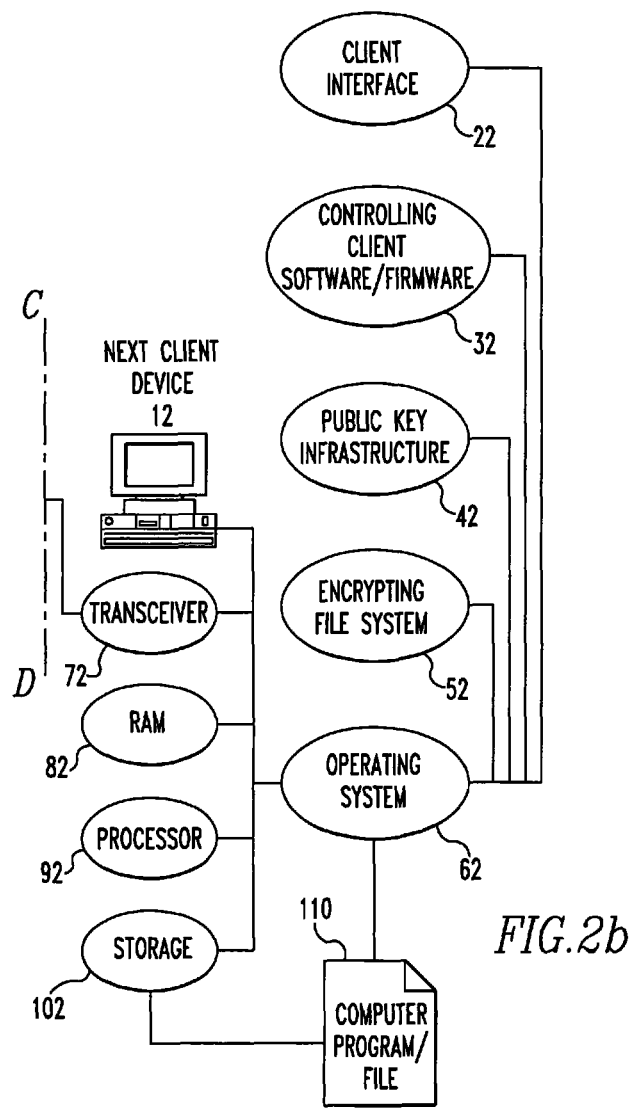

Referring now to the drawings wherein like reference numerals refer to similar or identical parts throughout the several views, and more specifically to FIGS. 1 and 2 thereof, there is shown a system for manipulating a computer file and/or program. The system comprises a serving device 10 having access to a computer file and/or program which is unencrypted and which can encrypt the unencrypted computer file and/or program to become an encrypted computer file and/or program and transfer it. The system comprises a connector connected to the serving device 10 on which the encrypted computer file and/or program travels and to which the serving device 10 transfers the encrypted computer file and/or program. The connector can be communication means 120. The system comprises a client device 11 which receives the encrypted computer file and/or program and decrypts the encrypted computer file and/or program back to the unencrypted computer file and/or program. The client device 11 does not allow intervention to the encrypted computer file and/or program during a time when the encrypted computer and/or file program is received. The serving device 10 is separate, apart and distinct from the client device 11.

Preferably, the server device assigns permissions and/or rights to the unencrypted computer file and/or program which identifies what the client device 11 can do with the unencrypted or encrypted computer file and/or program after the client device 11 has received the encrypted computer file and/or program or after the client device 11 has decrypted the encrypted computer file and/or program back to the unencrypted computer file and/or program. The server device preferably encrypts the permissions and/or rights and transfers them to the client device 11 through the connector. The client device 11 decrypts the unencrypted permissions and/or rights.

Preferably, the serving device 10 includes controlling server software and/or firmware 30 which causes the encryption of the unencrypted computer file and/or program and the permissions and/or rights and instructs the client device 11 to temporarily suspend user intervention when the client device 11 receives the encrypted computer file and/or program and the encrypted permissions and/or rights. The client device 11 preferably includes controlling client software and/or firmware 31 which causes the decryption of the encrypted computer file and/or program. Preferably, the client device 11 has a mechanism for requesting the unencrypted computer file and/or program from the server device.

The controlling client software and/or firmware 31 preferably causes the encryption of the unencrypted computer file and/or program and the permissions and/or rights for storage. Preferably, the client device 11 has an operating system and the controlling client software and/or firmware 51 instructs the operating system to reestablish user intervention at a desired time. The server device preferably has a server public key infrastructure 41 which encrypts using encrypted communication protocols the permissions and/or rights and the unencrypted computer file and/or program.

Preferably, the client device 11 has a client public key infrastructure 42 which decrypts from transmission the permissions and/or rights and encrypted computer file and/or program using encrypted communication protocols. The client device 11 preferably includes an encrypting file system 51 which encrypts the unencrypted computer file and/or program and the permissions and/or rights and allows for the manual selection of the unencrypted computer file and/or program for encryption or decryption. Preferably, the client public key infrastructure 42 has an encryption and/or decryption key and the encrypting file system 51 uses the encryption and/or decryption key utilized by the client public key infrastructure 42.

The system preferably includes a next client device 20 connected to the client device 11 through the connector. Preferably, the controlling client software and/or firmware 31 moves or copies the encrypted computer file and/or program to the next client device 20 through the second connector, said client device 11 having a controlling next client software and/or firmware which decrypts the received encrypted computer file and/or program and the encrypted permissions and/or rights and temporarily suspends user intervention of the next client device 20 while the encrypted computer file and/or program is received by the next client device 20. Preferably, the connector includes a communication link, the server device includes a transmitter connected to the communication link for transferring the encrypted computer file and/or program and unencrypted permissions and/or rights to the communication link, and the client device 11 includes a receiver connected to the communication link which receives the encrypted computer file and/or program and the encrypted permissions and/or rights from the communication link. The connector is preferably part of the Internet or other communication network.

The present invention pertains to a method for manipulating a computer file and/or program. The method comprises the steps of suspending intervention by a user at a client device 11 of the client device 11. Then there is the step of encrypting an unencrypted computer file and/or program at the server device to form an encrypted computer file and/or program. Next there is the step of transferring the encrypted computer file and/or program to the client device 11 along a connector connected to the client device 11 and the server device. Then there is the step of reestablishing the intervention of the client device 11 by the user.

Before the transferring step, there is preferably the step of encrypting permissions and/or rights of the unencrypted computer file and/or program and transferring the encrypted permission and/or rights to the client device 11 along the connector from the server device. Preferably, before the encrypting the unencrypted computer file and/or program step there is the step of requesting by the client device 11 the unencrypted computer file and/or program of the server device. After the requesting step there is preferably the step of copying a primary unencrypted computer file and/or program to form the unencrypted computer file and/or program.

Preferably, before the reestablishing step, there is the step of decrypting the encrypted computer file and/or program back to the unencrypted computer file and/or program at the client device 11. After the decrypting step, there are preferably the steps of encrypting the unencrypted computer file and/or program and permissions and/or rights at the client device 11 and storing the encrypted computer program and/or file and the encrypted permissions and/or rights in the client device 11. Preferably, after the storing step, there is the step of transferring the encrypted computer file and/or program to a next client device 20 connected to the client device 11 by the connector.

Figure 3B:
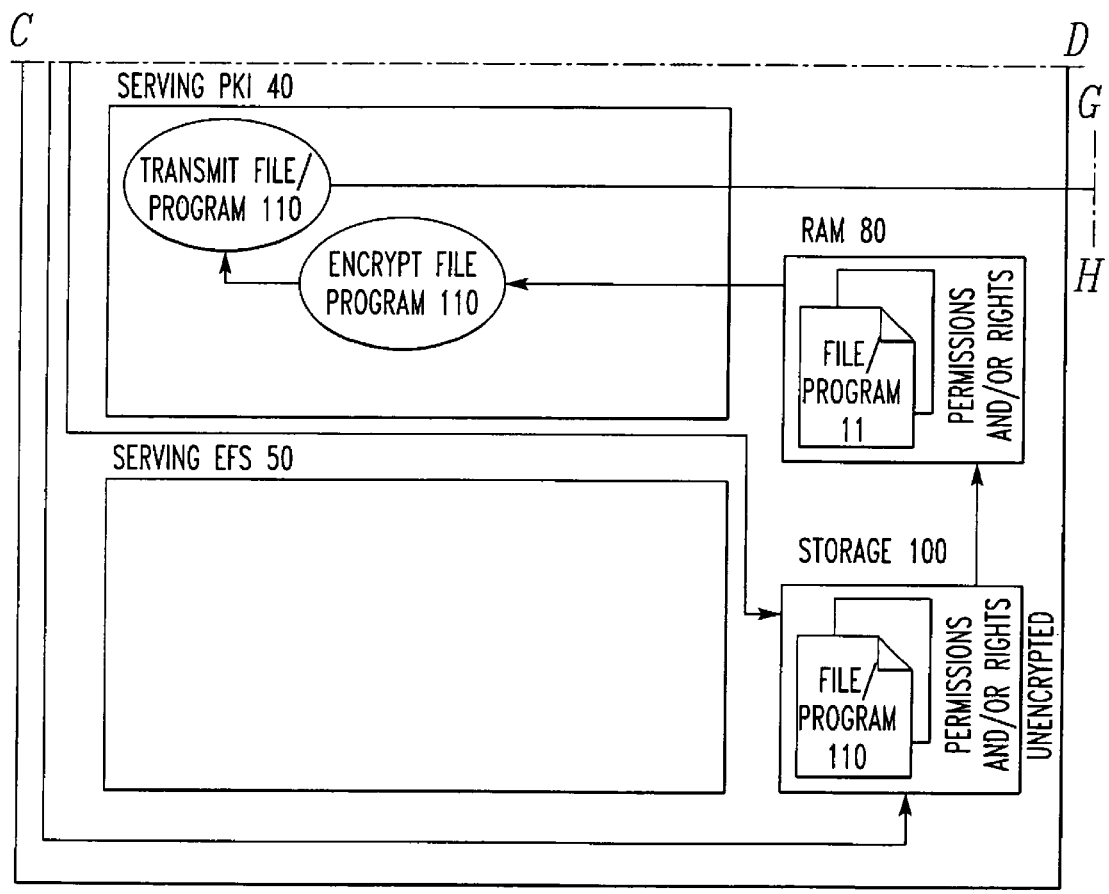
FIG. 3 is a computer programming flowchart which may be used in carrying out the teachings of this invention for the purpose of automatically invoking functionality of the Operating System 60 of the Serving Device 10 to: encrypt and transmit a Computer File and/or Program 110, and its associated permissions and/or rights, to a Client Device 11 through use of a Transceiver 70 connected to a Communication Means 120.
Figure 3C:
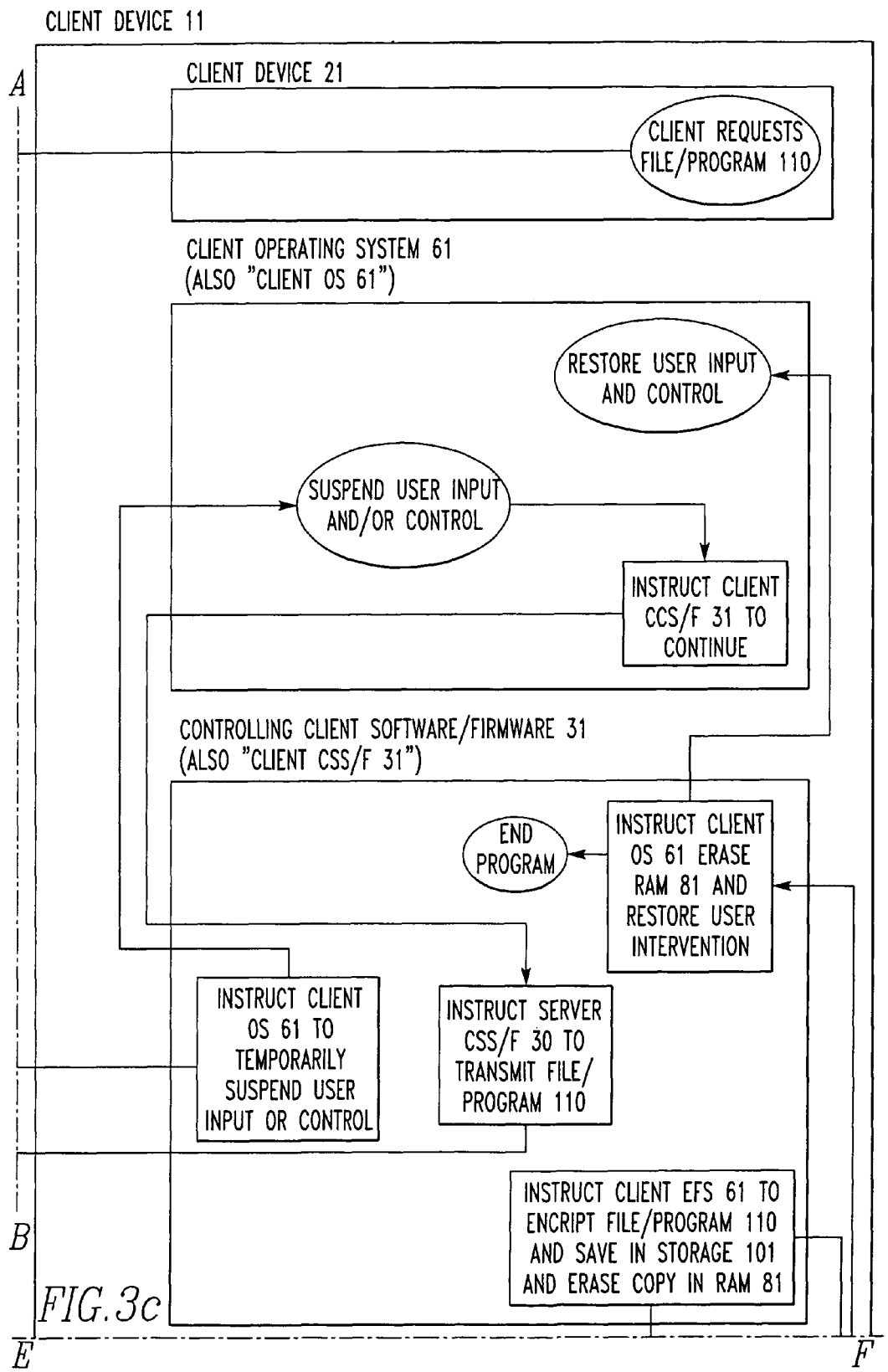
Figure 3D:
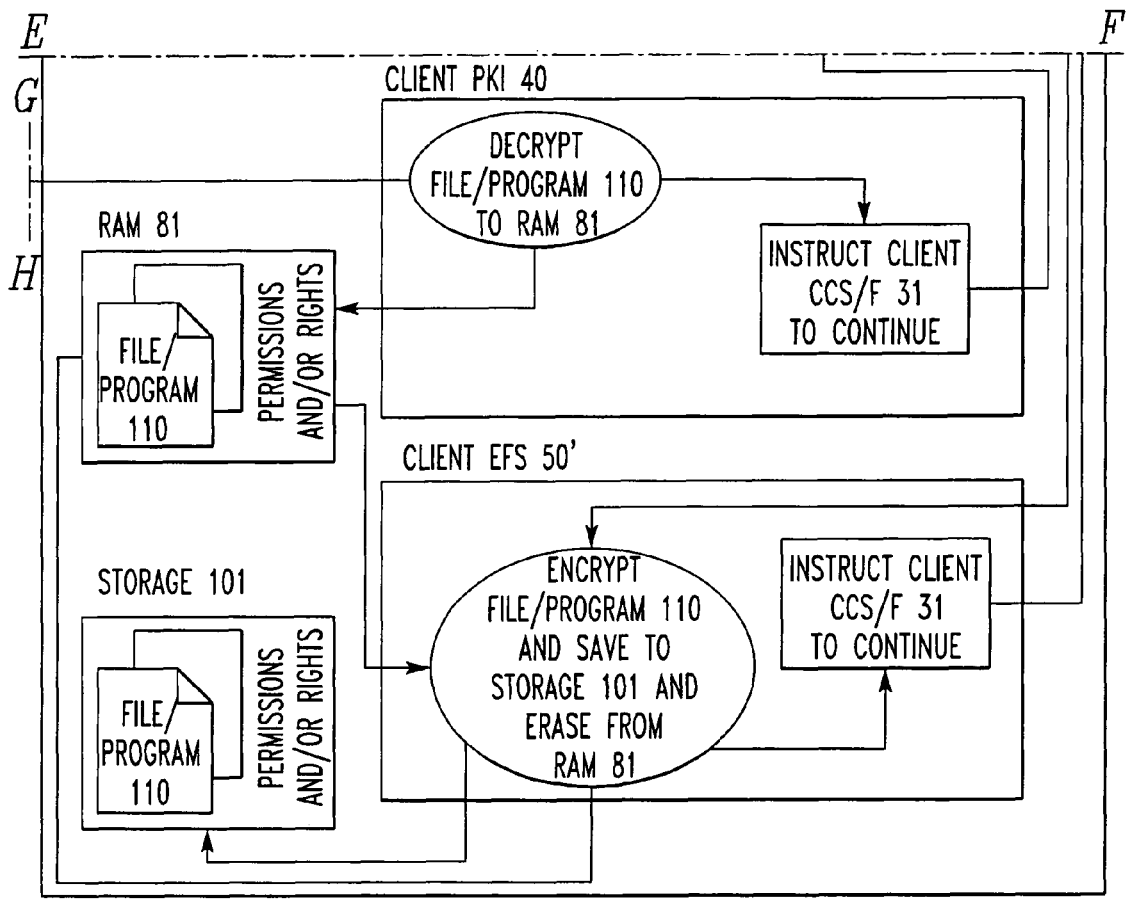

Referring now to the drawings wherein like reference numerals refer to similar or identical parts throughout the several views, and more specifically to FIG. 1 and FIG. 3 thereof, there are shown apparatuses 30 and 31 for invoking functionality of the Operating Systems 60 and 61 of computing devices Serving Device 10 and Client Device 11, respectively. The apparatuses 30 and 31 are connected to the Operating Systems 60 and 61 of computing devices Serving Device 10 and Client Device 11, respectively. The apparatus 30 comprises a means or mechanism for invoking functionality of an Operating System 60 of a Serving Device 10 to: instruct the apparatus 31 to instruct the Operating System 61 to temporarily suspend user intervention of the Client Device 11 during the execution of the functionality of the apparatus 30 and 31; conduct encrypted communications through use of a Transceiver 70 connected to a Communication Means 120; encrypt and transmit a Computer File and/or Program 110, and its associated permissions and/or rights, to a Client Device 11 through use of a Transceiver 70 connected to a Communication Means 120. The apparatus 31 comprises a means or mechanism for invoking functionality of an Operating System 61 of a Client Device 11 to: instruct the Operating System 61 to temporarily suspend user intervention of the Client Device 11 during the execution of the functionality of the apparatus 30 and 31; conduct encrypted communications through use of a Transceiver 70 connected to a Communication Means 120; receive and decrypt a Computer File and/or Program 110, and its associated permissions and/or rights, from transmission from a Serving Device 10 through use of a Transceiver 71 connected to a Communication Means 120 and store an electronic copy thereof in RAM 81; encrypt and save said Computer File and/or Program 110 from RAM 81 to Storage 101 using said associated permissions and/or rights, and then erase any electronic copies of said Computer File and/or Program 110 from RAM 81; instruct the Operating System 61 to restore user intervention of the Client Device 11 upon completion of the execution of the functionality of the apparatus 30 and 31.

Figure 4A:
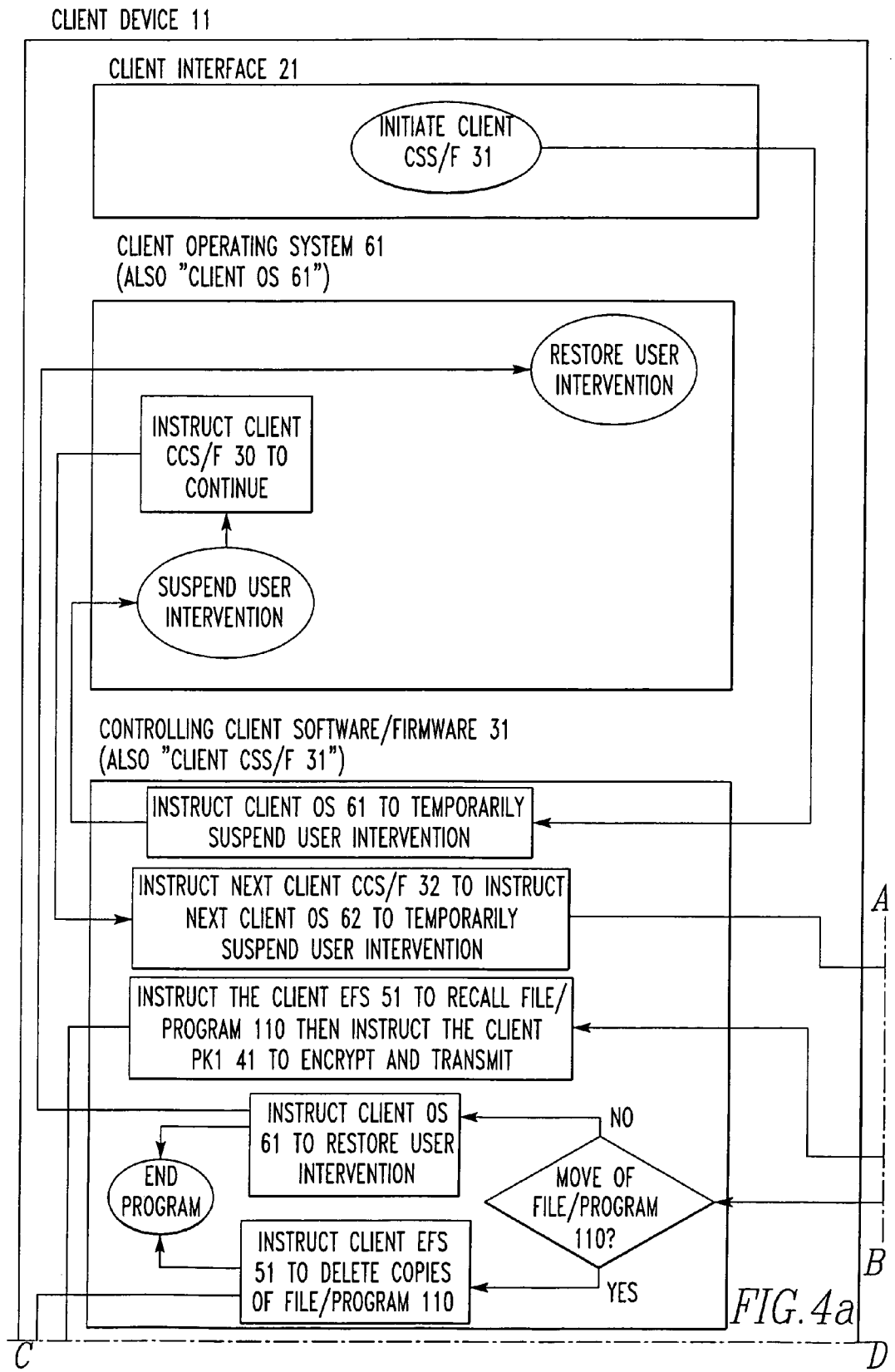
FIG. 4 is a computer programming flowchart which may be used in carrying out the teachings of this invention for the purposes of automatically invoking functionality of the Operating System 61 of the Client Device 11 to: decrypt a Computer File and/or Program 110 from Storage 101 and store an electronic copy thereof, and store the associated permissions and/or rights, in RAM 81; and encrypt and transmit a Computer File and/or Program 110, and its associated permissions and/or rights, to a Next Client Device 11 through use of a Transceiver 71 connected to a Communication Means 120; and then erase any electronic copies of said Computer File and/or Program 110 from RAM 81; and, in the case of a move of said Computer File and/or Program 110 from Storage 101 to Storage 102, then erase any electronic copies of said Computer File and/or Program 110 from Storage 101.
Figure 4B:
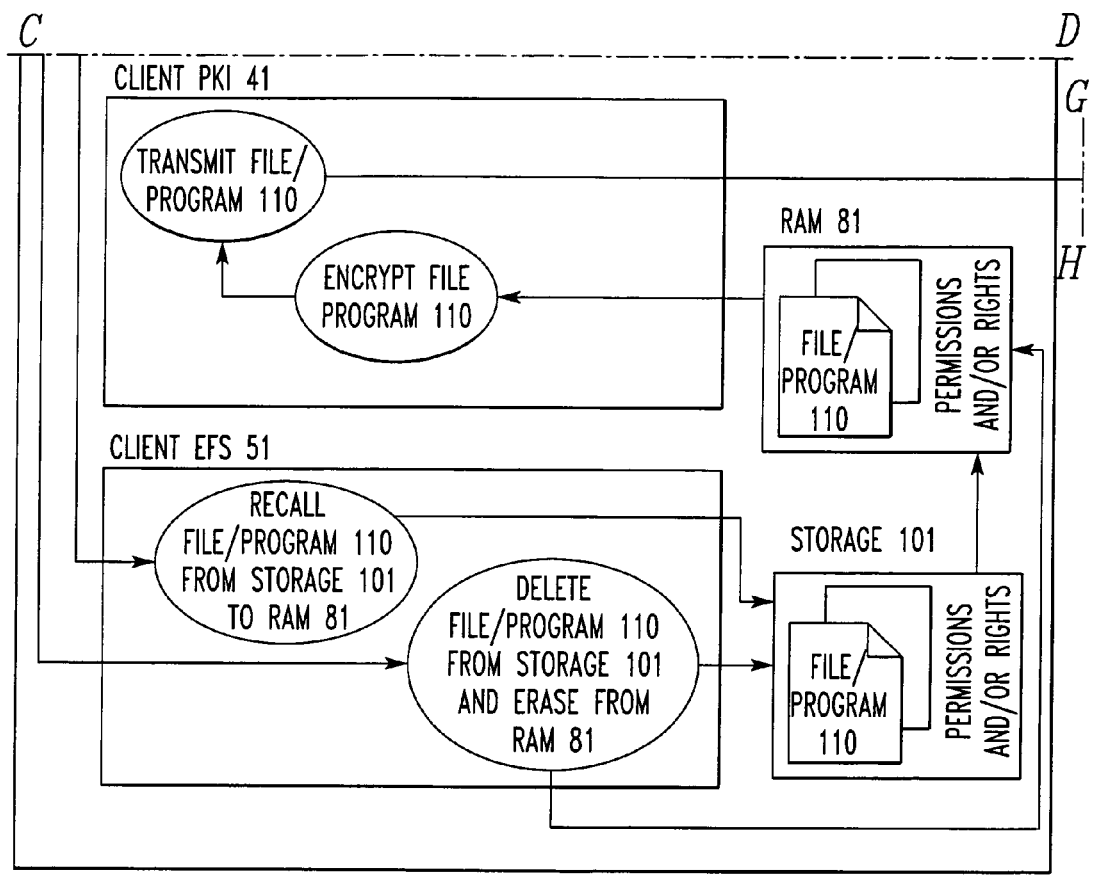
Figure 4D:
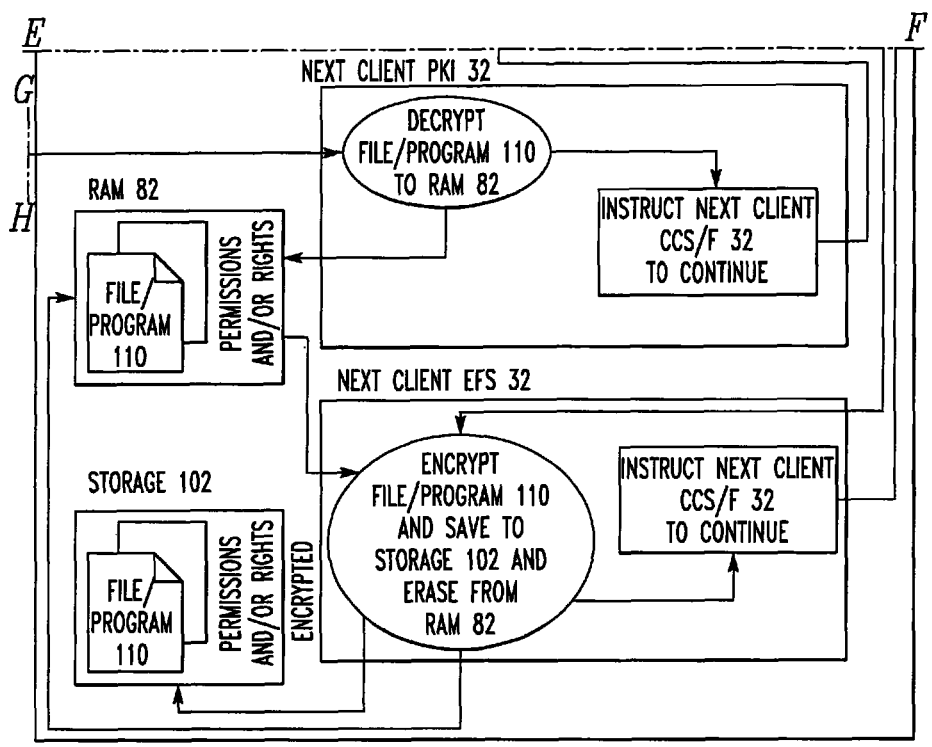

Referring now to the drawings wherein like reference numerals refer to similar or identical parts throughout the several views, and more specifically to FIG. 2 and FIG. 4 thereof, there is shown apparatuses 31 and 32 for invoking functionality of the Operating Systems 61 and 62 of computing devices Client Device 11 and Next Client Device 12, respectively. The apparatuses 31 and 32 are connected to the Operating Systems 61 and 62 of computing devices Client Device 11 and Next Client Device 12, respectively. The apparatus 31 comprises a means or mechanism for invoking functionality of an Operating System 61 of a Client Device 11 to: instruct the Operating System 61 to temporarily suspend user intervention of the Client Device 11 during the execution of the functionality of the apparatus 31 and 32; instruct the apparatus 32 to instruct the Operating System 62 to temporarily suspend user intervention of the Next Client Device 12 during the execution of the functionality of the apparatus 31 and 32; conduct encrypted communications through use of a Transceiver 71 connected to a Communication Means 120; decrypt a Computer File and/or Program 110 from Storage 101 and store an electronic copy thereof, and store the associated permissions and/or rights, in RAM 81; encrypt and transmit a Computer File and/or Program 110, and its associated permissions and/or rights, to a Next Client Device 12 through use of a Transceiver 71 connected to a Communication Means 120; and then erase any electronic copies of said Computer File and/or Program 110 from RAM 81; and, in the case of a move of said Computer File and/or Program 110 from to Storage 101 to Storage 102, then erase any electronic copies of said Computer File and/or Program 110 from Storage 101; instruct the Operating System 61 to restore user intervention of the Client Device 11 upon completion of the execution of the functionality of the apparatus 31.

The apparatus 32 comprises a means or mechanism for invoking functionality of an Operating System 62 of a Next Client Device 12 to: instruct the Operating System 62 to temporarily suspend user intervention of the Next Client Device 12 during the execution of the functionality of the apparatus 31 and 32; conduct encrypted communications through use of a Transceiver 71 connected to a Communication Means 120; receive and decrypt a Computer File and/or Program 110, and its associated permissions and/or rights, from transmission from a Client Device 11 through use of a Transceiver 72 connected to a Communication Means 120 and store an electronic copy thereof in RAM 82; encrypt and save said Computer File and/or Program 110 from RAM 82 to Storage 102 using said associated permissions and/or rights, and then erase any electronic copies of said Computer File and/or Program 110 from RAM 82; instruct the Operating System 62 to restore user intervention of the Next Client Device 12 upon completion of the execution of the functionality of the apparatus 32.

Referring now to FIG. 1 and FIG. 3, one preferred embodiment of the invention is comprised of the following:

- 10 Serving Device
- 11 Client Device
- 20 Serving Interface
- 21 Client Interface
- 30 Controlling Serving Software and/or Firmware (also "Serving CSS and/or F")
- 31 Controlling Client Software and/or Firmware (also "Client CCS and/or F")
- 40 Public Key Infrastructure
- 41 Public Key Infrastructure
- 50 Encrypting File System
- 51 Encrypting File System
- 60 Operating System
- 61 Operating System
- 70 Transceiver
- 71 Transceiver
- 80 Random Access Memory (also "RAM")
- 81 Random Access Memory (also "RAM")
- 90 Processor
- 91 Processor
- 100 Storage
- 101 Storage
- 110 Computer File and/or Program (also "File and/or Program")
- 120 Communication Means In FIG. 1 and FIG. 3, the following components are already commercially available: the Serving Device 10, the Client Device 11, the Serving Interface 20, the Client Interface 21, the Public Key Infrastructure 40, the Public Key Infrastructure 41, the Encrypting File System 50, the Encrypting File System 51, the Operating System 60, the Operating System 61, the Transceiver 70, the Transceiver 71, the Random Access Memory 80 (also "RAM 80"), the Random Access Memory 81 (also "RAM 81"), the Processor 90, the Processor 91, the Storage 100, the Storage 101, the Computer File and/or Program 110 (also "File and/or Program 110"), and the Communication Means 120. The Controlling Serving Software and/or Firmware 30 (also "Serving CSS and/or F 30"), and the Controlling Client Software and/or Firmware 31 (also "Client CCS and/or F 31") are new teachings of this invention.

Referring now to FIG. 2 and FIG. 4, one preferred embodiment of the invention is comprised of the following:

- 11 Client Device
- 12 Next Client Device
- 21 Client Interface
- 22 Next Client Interface
- 31 Controlling Client Software and/or Firmware (also "Client CCS and/or F")
- 32 Controlling Client Software and/or Firmware (also "Next Client CCS and/or F")
- 41 Public Key Infrastructure
- 42 Public Key Infrastructure
- 51 Encrypting File System
- 52 Encrypting File System
- 61 Operating System
- 62 Operating System
- 71 Transceiver
- 72 Transceiver
- 81 Random Access Memory (also "RAM")
- 82 Random Access Memory (also "RAM")
- 91 Processor
- 92 Processor
- 101 Storage
- 102 Storage
- 110 Computer File and/or Program (also "File and/or Program")
- 120 Communication Means In FIG. 2 and/or FIG. 4, the following components are already commercially available: the Client Device 11, the Next Client Device 12, the Client Interface 21, the Next Client Interface 22, the Public Key Infrastructure 41, the Public Key Infrastructure 42, the Encrypting File System 51, the Encrypting File System 52, the Operating System 61, the Operating System 62, the Transceiver 71, the Transceiver 72, the Random Access Memory 81 (also "RAM 81"), the Random Access Memory 82 (also "RAM 82"), the Processor 91, the Processor 92, the Storage 101, the Storage 102, the Computer File and/or Program 110 (also "File and/or Program 110"), and the Communication Means 120. The Controlling Client Software and/or Firmware 31 (also "Client CCS and/or F 31"), and the Controlling Client Software and/or Firmware 32 (also "Next Client CCS and/or F 32") are new teachings of this invention.

The Serving Device 10 (such as, but not limited to, a Web Server, PC, Mac, PalmPC, Laptop, etc.) is a means or mechanism which can electronically communicate with other computing devices. The Serving Device 10 is also a means or mechanism by which computer files can be transmitted to other computing devices. The Serving Device 10 may contain a video display, audio speakers, and other computing peripherals.

The Client Device 11 (such as, but not limited to, a Web Server, PC, Mac, PalmPC, Laptop, etc.) is a means or mechanism by which computer files can be transmitted to or from other computing devices. The Client Device 11 is also a means or mechanism by which computer files can be received from other computing devices. The Client Device 11 may contain a video display, audio speakers, and other computing peripherals.

The Next Client Device 12 (such as, but not limited to, a Web Server, PC, Mac, PalmPC, Laptop, etc.) is a means or mechanism by which computer files can be transmitted to or from other computing devices. The Next Client Device 12 is also a means or mechanism by which computer files can be received from other computing devices. The Next Client Device 12 may contain a video display, audio speakers, and other computing peripherals.

The Serving Interface 20 (such as, but not limited to, web server commerce software such as the Microsoft Commerce Server) is a means or mechanism which can receive and execute requests transmitted from another computing device.

The Client Interface 21 (such as, but not limited to, web browser software such as the Microsoft Internet Explorer) is a means or mechanism which can transmit requests to another computing device and can display the contents of the Serving Interface 20 and the Next Client Interface 22.

The Next Client Interface 22 (such as, but not limited to, web browser software such as the Microsoft Internet Explorer) is a means or mechanism which can transmit requests to another computing device and can display the contents of the Client Interface 21.

The Controlling Serving Software and/or Firmware 30 is a means or mechanism to instruct the Operating System 60, or a communication program thereof, to communicate with a Client Device 11 via Communication Means 120. The Controlling Serving Software and/or Firmware 30 is also a means or mechanism to instruct the Controlling Client Software and/or Firmware 31 to instruct the Operating System 61 to temporarily suspend user intervention of the Client Device 11 during the execution of the functionality of the Controlling Serving Software and/or Firmware 30 and the Controlling Client Software and/or Firmware 31. The Controlling Serving Software and/or Firmware 30 is also a means or mechanism to receive instructions from a Controlling Client Software and/or Firmware 31 via Communication Means 120. The Controlling Serving Software and/or Firmware 30 is also a means or mechanism to enable the user of the Serving Device 10 to establish third party usage permissions and/or rights to be associated with a Computer File and/or Program 110 thereby limiting the usage of the Computer File and/or Program 110 by the Client Device 11 or the Next Client Device 12. The Controlling Serving Software and/or Firmware 30 is also a means or mechanism to automatically instruct a Public Key Infrastructure 40 of a Serving Device 10 to encrypt and transmit usage permissions and/or rights associated with a Computer File and/or Program 110 and to encrypt and transmit a Computer File and/or Program 110 to a Client Device 11 via Communication Means 120. The Controlling Serving Software and/or Firmware 30 may be embodied in computer coding software (such as, but not limited to, a program authored in the computer language c++) to execute the described functions).

The Controlling Client Software and/or Firmware 31 is a means or mechanism to automatically instruct the Operating System 61, or a communication program thereof, to communicate with a Serving Device 10 or a Next Client Device 12 via Communication Means 120. The Controlling Client Software and/or Firmware 31 is also a means or mechanism to receive instructions from a Controlling Serving Software and/or Firmware 30 via Communication Means 120. The Controlling Client Software and/or Firmware 31 is also a means or mechanism to instruct the Operating System 61 to temporarily suspend user intervention of the Client Device 11 during the execution of the functionality of the Controlling Serving Software and/or Firmware 30 and the Controlling Client Software and/or Firmware 31. The Controlling Client Software and/or Firmware 31 is also a means or mechanism to automatically instruct a Public Key Infrastructure 41 of a Client Device 11 to receive and decrypt from transmission usage permissions and/or rights associated with a Computer File and/or Program 110 and to receive and decrypt from transmission a Computer File and/or Program 110 transmitted from a Serving Device 10 via Communication Means 120 and place an electronic copy thereof in RAM 81. The Controlling Client Software and/or Firmware 31 is also a means or mechanism to automatically instruct the Encrypting File System 51 of a Client Device 11 to recall a Computer File and/or Program 110 from RAM 81 and encrypt and save an electronic copy thereof to Storage 101, using said permissions and/or rights associated with said Computer File and/or Program 110 and transmitted by the Serving Device 10. The Controlling Client Software and/or Firmware 31 is a means or mechanism to instruct the Operating System 61 to restore user intervention of the Client Device 11 upon completion of the execution of the functionality of the Controlling Serving Software and/or Firmware 30 and Controlling Client Software and/or Firmware 31. The Controlling Client Software and/or Firmware 31 is a means or mechanism to instruct the Operating System 61 to temporarily suspend user intervention of the Client Device 11 during execution of the functionality of the Controlling Client Software and/or Firmware 31 and Controlling Client Software and/or Firmware 32. The Controlling Client Software and/or Firmware 31 is a means or mechanism to instruct the Controlling Client Software and/or Firmware 32 to instruct the Operating System 62 to temporarily suspend user intervention of the Next Client Device 12 during execution of the functionality of the Controlling Client Software and/or Firmware 31 and Controlling Client Software and/or Firmware 32. The Controlling Client Software and/or Firmware 31 is also a means or mechanism to receive instructions from a Controlling Client Software and/or Firmware 32 of a Next Client Device 12 via Communication Means 120. The Controlling Client Software and/or Firmware 31 is also a means or mechanism to automatically instruct the Encrypting File System 51 of a Client Device 11 to decrypt a Computer File and/or Program 110 from Storage 101 and place an electronic copy thereof in RAM 81. The Controlling Client Software and/or Firmware 31 is also a means or mechanism to automatically instruct the Public Key Infrastructure 41 of a Client Device 11 to encrypt and transmit via Communication Means 120 a Computer File and/or Program 110 to a Next Client Device 12. The Controlling Client Software and/or Firmware 31 is also a means or mechanism to instruct the Operating System 61 to restore user intervention of the Client Device 11 upon completion of the execution of the functionality of the Controlling Client Software and/or Firmware 31. The Controlling Client Software and/or Firmware 31 may be embodied in computer coding software (such as, but not limited to, a program authored in the computer language c++) to execute the functions described hereinabove. The Controlling Client Software and/or Firmware 31 has many embodiments similar to those of the Controlling Client Software and/or Firmware 32.

The Controlling Client Software and/or Firmware 32 is a means or mechanism to automatically instruct the Operating System 62, or a communication program thereof, to electronically communicate with a Client Device 12 via Communication Means 120. The Controlling Client Software and/or Firmware 32 is also a means or mechanism to receive instructions from a Controlling Client Software and/or Firmware 31, of a Client Device 11, via Communication Means 120. The Controlling Client Software and/or Firmware 32 is also a means or mechanism to instruct the Operating System 62 to temporarily suspend user intervention of the Next Client Device 12 during the execution of the functionality of the Controlling Client Software and/or Firmware 31 and the Controlling Client Software and/or Firmware 32. The Controlling Client Software and/or Firmware 32 is also a means or mechanism to automatically instruct the Public Key Infrastructure 42 of a Next Client Device 12 to receive and decrypt from transmission, usage permissions and/or rights associated with a Computer File and/or Program 110 and to receive and decrypt from transmission a Computer File and/or Program 110 transmitted from a Client Device 11 via Communication Means 120 and place an electronic copy thereof in RAM 82. The Controlling Client Software and/or Firmware 32 is also a means or mechanism to automatically instruct the Encrypting File System 52 of a Next Client Device 12 to recall a Computer File and/or Program 110 from RAM 82 and encrypt and save an electronic copy thereof to Storage 102, using said permissions and/or rights associated with said Computer File and/or Program 110 and transmitted by a Client Device 11. The Controlling Client Software and/or Firmware 32 is a means or mechanism to instruct the Operating System 62 to restore user intervention of the Next Client Device 12 upon completion of the execution of the functionality of the Controlling Client Software and/or Firmware 31 and Controlling Client Software and/or Firmware 32. The Controlling Client Software and/or Firmware 32 may be embodied in computer coding software (such as, but not limited to, a program authored in the computer language c++) to execute the functions described hereinabove. The Controlling Client Software and/or Firmware 32 has many embodiments similar to those of the Controlling Client Software and/or Firmware 31.

The Public Key Infrastructure 40 (such as, but not limited to, the Public Key Infrastructure of Microsoft Windows 2000 Server family, formerly known as Microsoft Windows NT Server version 5.0) of a Serving Device 10 is a cryptography means or mechanism which provides public encryption and private decryption keys enabling the Serving Device 10 to conduct encrypted communications using encrypted communication protocols (such as, but not limited to, secure sockets layer (SSL), transport layer security (TLS), virtual private network (VPN), etc.) via Communication Means 120. The Public Key Infrastructure 40 of the Serving Device 10 is also a cryptography means or mechanism which provides public encryption and private decryption keys to other components of the Operating System 60, or applications running on the Operating System 60.

The Public Key Infrastructure 41 (such as, but not limited to, the Public Key Infrastructure of Microsoft Windows 2000 professional, formerly known as Microsoft Windows NT Workstation version 5.0) of a Client Device 11 is a cryptography means or mechanism which provides public encryption and private decryption keys enabling the Client Device 11 to conduct encrypted communications using encrypted communication protocols (such as, but not limited to, secure sockets layer (SSL), transport layer security (TLS), virtual private network (VPN), etc.) via Communication Means 120. The Public Key Infrastructure 41 of the Client Device 11 is also a cryptography means or mechanism which provides public encryption and private decryption keys to other components of the Operating System 61, or applications running on the Operating System 61.

The Public Key Infrastructure 42 (such as, but not limited to, the Public Key Infrastructure of Microsoft Windows 2000 professional, formerly known as Microsoft Windows NT Workstation version 5.0) of a Next Client Device 12 is a cryptography means or mechanism which provides public encryption and private decryption keys enabling said Next Client Device 12 to conduct encrypted communications using encrypted communication protocols (such as, but not limited to, secure sockets layer (SSL), transport layer security (TLS), virtual private network (VPN), etc.) via Communication Means 120. The Public Key Infrastructure 42 of the Next Client Device 12 is also a cryptography means or mechanism which provides public encryption and private decryption keys to other components of the Operating System 62, or applications running on the Operating System 62.

The Encrypting File System 50 (such as, but not limited to, the Encrypting File System of Microsoft Windows 2000 Server, formerly known as Microsoft Windows NT Server version 5.0) is a means or mechanism to permit the user of a Serving Device to manually select computer files or folders to encrypt or decrypt. The Encrypting File System 50 is also a means or mechanism to encrypt a Computer File and/or Program 110 using a randomly generated and secret encryption and/or decryption key. The Encrypting File System 50 is also a means or mechanism to encrypt said randomly generated secret encryption and/or decryption key using the public encryption key of the Public Key Infrastructure 40 and save it to Storage 100 and associating said randomly generated secret encryption and/or decryption key with said Computer File and/or Program 110. The Encrypting File System 50 is also a means or mechanism to decrypt the copy of said randomly generated secret encryption and/or decryption key associated with said Computer File and/or Program 110 using the private decryption key of the Public Key Infrastructure 40 to then decrypt said Computer File and/or Program 110 using said randomly generated secret encryption and/or decryption key in real time during read and write operations of the Serving Device 10.

The Encrypting File System 51 (such as, but not limited to, the Encrypting File System of Microsoft Windows 2000 professional, formerly known as Microsoft Windows NT Workstation version 5.0) is a means or mechanism to permit the user of a Client Device to manually select computer files or folders to encrypt or decrypt. The Encrypting File System 51 is also a means or mechanism to encrypt a Computer File and/or Program 110 using a randomly generated and secret encryption and/or decryption key. The Encrypting File System 51 is also a means or mechanism to encrypt said randomly generated secret encryption and/or decryption key using the public encryption key of the Public Key Infrastructure 41 and save it to Storage 101 and associating said randomly generated secret encryption and/or decryption key with said Computer File and/or Program 110. The Encrypting File System 51 is also a means or mechanism to decrypt the copy of said randomly generated secret encryption and/or decryption key associated with said Computer File and/or Program 110 using the private decryption key of the Public Key Infrastructure 41 to then decrypt said Computer File and/or Program 110 using said randomly generated secret encryption and/or decryption key in real time during read and write operations of the Client Device 11.

The Encrypting File System 52 (such as, but not limited to, the Encrypting File System of Microsoft Windows 2000 professional, formerly known as Microsoft Windows NT Workstation version 5.0) is a means or mechanism to permit the user of a Next Client Device 12 to manually select computer files or folders to encrypt or decrypt. The Encrypting File System 52 is also a means or mechanism to encrypt a Computer File and/or Program 110 using a randomly generated and secret encryption and/or decryption key. The Encrypting File System 52 is also a means or mechanism to encrypt said randomly generated secret encryption and/or decryption key using the public encryption key of the Public Key Infrastructure 42 and save it to Storage 102 and associating said randomly generated secret encryption and/or decryption key with said Computer File and/or Program 110. The Encrypting File System 52 is also a means or mechanism to decrypt the copy of said randomly generated secret encryption and/or decryption key associated with said Computer File and/or Program 110 using the private decryption key of the Public Key Infrastructure 42 to then decrypt said Computer File and/or Program 110 using said randomly generated secret encryption and/or decryption key in real time during read and write operations of the Next Client Device 12.

The Operating System 60 (such as, but not limited to, the Microsoft Windows 2000 Server, formerly known as Microsoft Windows NT Server version 5.0) is a means or mechanism to permit computing functionality of a Serving Device 10.

The Operating System 61 (such as, but not limited to, the Microsoft Windows 2000 professional, formerly known as Microsoft Windows NT Workstation version 5.0) is a means or mechanism to permit computing functionality of a Client Device 11.

The Operating System 62 (such as, but not limited to, the Microsoft Windows 2000 professional, formerly known as Microsoft Windows NT Workstation version 5.0) is a means or mechanism to permit computing functionality of a Next Client Device 12.

The Transceiver 70 (such as, but not limited to a modem, cable modem, network interface card, etc.) is a means or mechanism to electronically send and receive communication signals via a Communication Means 120. The Transceiver 70 is a means or mechanism used by software and/or firmware of, or connected to, the Serving Device 10 and/or the Operating System 60, to electronically communicate via a Communication Means 120. The Transceiver 70 is connected to the Serving Device 10 and is connected to the Communication Means 120.

The Transceiver 71 (such as, but not limited to a modem, cable modem, network interface card, etc.) is a means or mechanism to electronically send and receive communication signals via a Communication Means 120. The Transceiver 71 is a means or mechanism used by software and/or firmware of, or connected to, the Client Device 11 and/or the Operating System 61, to electronically communicate via a Communication Means 120. The Transceiver 71 is connected to the Client Device 11 and is connected to the Communication Means 120.

The Transceiver 72 (such as, but not limited to a modem, cable modem, network interface card, etc.) is a means or mechanism to electronically send and receive communication signals via a Communication Means 120. The Transceiver 72 is a means or mechanism used by software and/or firmware of, or connected to, the Next Client Device 12 and/or the Operating System 62, to electronically communicate via a Communication Means 120. The Transceiver 72 is connected to the Next Client Device 12 and is connected to the Communication Means 120.

The Random Access Memory 80 (also "RAM 80") is a means or mechanism used by the Operating System 60 of a Serving Device 10 to temporarily store computer files, computer programs or other computer information for use by the Operating System 60, computer programs running on the Operating System 60 or other computer peripheral devices of said Serving Device 10.

The Random Access Memory 81 (also "RAM 81") is a means or mechanism used by the Operating System 61 of a Client Device 11 to temporarily store computer files, computer programs or other computer information for use by the Operating System 61, computer programs running on the Operating System 61 or other computer peripheral devices of said Client Device 11.

The Random Access Memory 82 (also "RAM 82") is a means or mechanism used by the Operating System 62 of a Next Client Device 12 to temporarily store computer files, computer programs or other computer information for use by the Operating System 62, computer programs running on the Operating System 62 or other computer peripheral devices of said Next Client Device 12.

The Processor 90 is a means or mechanism of a Serving Device 10 to electronically process instructions of the Operating System 60, other computer programs running on said Operating System 60 or other computer peripheral devices of said Serving Device 10. The Processor 90 is also a means or mechanism of a Serving Device 10 to electronically process instructions of other peripheral software and/or firmware devices of said Serving Device 10.

The Processor 91 is a means or mechanism of a Client Device 11 to electronically process instructions of the Operating System 61, other computer programs running on said Operating System 61 or other computer peripheral devices of said Client Device 11. The Processor 91 is also a means or mechanism of a Client Device 11 to electronically process instructions of other peripheral software and/or firmware devices of said Client Device 11.

The Processor 92 is a means or mechanism of a Next Client Device 12 to electronically process instructions of the Operating System 62, other computer programs running on said Operating System 62 or other computer peripheral devices of said Next Client Device 12. The Processor 92 is also a means or mechanism of a Next Client Device 12 to electronically process instructions of other peripheral software and/or firmware devices of said Next Client Device 12.

The Storage 100 is a means or mechanism in, or connected to, a Serving Device 10, which can be used to electronically save an electronic copy of the digital code of a computer program or computer file from RAM 80 of said Serving Device 10.

The Storage 101 is a means or mechanism in, or connected to, a Client Device 11, which can be used to electronically save an electronic copy of the digital code of a computer program or computer file from RAM 81 of said Client Device 11.

The Storage 102 is a means or mechanism in, or connected to, a Next Client Device 12, which can be used to electronically save an electronic copy of the digital code of a computer program or computer file from RAM 82 of said Next Client Device 12.

The Computer File and/or Program 110 is a computer file or a computer program (such as, but not limited to, a word processing document (i.e. MS Word, Lotus WordPro), a spreadsheet file (such as, but not limited to, Lotus 1-2-3, MS Excel), an audio file (such as, but not limited to, MP3, WAV, AUI), a video file (such as, but not limited to, AVI, MPEG), an executable program (such as, but not limited to, EXE), etc.).

The Communication Means 120 (such as, but not limited to, telephone lines, cable TV lines, coax cable, fiber optics, radio, cellular, satellite, serial cables, parallel cables, infrared communication, universal serial bus (USB) cables, the Internet, LAN, Ethernet, network generally, etc.) is a means or mechanism by which computing devices connected thereto can electronically communicate. The Communication Means 120 is also a means or mechanism by which computing devices connected thereto can invoke encrypted communication protocols (such as, but not limited to, secure sockets layer (SSL), transport layer security (TLS), virtual private network (VPN), etc.) to transmit and receive encrypted signals. The Communication Means 120 is connected to the Transceiver 70, 71 and 72 of a Serving Device 10, a Client Device 11 and a Next Client Device 12, respectively.

The user of the Serving Device 10 saves a Computer File and/or Program 110 to Storage 100 within, or connected to, the Serving Device 10. The user of the Serving Device 10 establishes a link, connection or other form of electronic association (such as, but not limited to, a TCP and/or IP hyperlink) (collectively the "hyperlink") between the Serving Interface 20 and the location of said Computer File and/or Program 110 in Storage 100. The Transceiver 70 of the Serving Device 10 is connected to a Communication Means 120. The user of the Serving Device 10 inputs (such as, but not limited to, inputs via a keyboard, mouse, etc.) permissions and/or rights to be associated with the Computer File and/or Program 110 through the Controlling Serving Software and/or Firmware 30. Said permissions include, but are not limited to, moving or copying, etc., and said rights include, but are not limited to, the number of uses, expiration date of uses, assignment of permissions and/or rights to third parties, etc.

The user of the Client Device 11 communicates with the Serving Device 10 via the Communication Means 120. The Transceiver 71 of the Client Device 11 is connected to a Communication Means 120. The user of the Client Device 11 views the Serving Interface 20 on the video display of the Client Device 11 and identifies the hyperlink associated with the desired Computer File and/or Program 110. The user of the Client Device 11 uses the Client Interface 21 to initiate a hyperlink transmission request (such as, but not limited to, a double mouse click on the hyperlink associated with said Computer File and/or Program 110) via the Communication Means 120 to acquire said Computer File and/or Program 110 from the Serving Device 10. This request initiates a series of automated actions by the Controlling Serving Software and/or Firmware 30 then by the Controlling Client Software and/or Firmware 31. First, the Controlling Serving Software and/or Firmware 30 instructs the Controlling Client Software and/or Firmware 31 to instruct the Operating System 61 of the Client Device 11 to temporarily suspend user intervention to prevent any form of unauthorized data or instruction input into or throughout the Serving Device 10 or the Client Device 11 by a means or mechanism internal or external to either the Serving Device 10 or the Client Device 11, such as, but not limited to, user input or control through use of a keyboard, mouse or other physical means or mechanism; a computer program; macro; or any other means or mechanism which could in any way affect the functionality of the software and/or firmware of the present invention which could in any way affect the functionality of any software and/or firmware utilized by the present invention, and to prevent any form of unauthorized access to, use of, control over the Computer File and/or Program 110 during execution of the transmission request. Then the Controlling Client Software and/or Firmware 31 instructs the Operating System 61 of the Client Device 11 to temporarily suspend user intervention. Then the Controlling Client Software and/or Firmware 31 instructs the Controlling Serving Software and/or Firmware 30 to transmit the Computer File and/or Program 110 to the Client Device 11. Then the Controlling Serving Software and/or Firmware 30 instructs the Public Key Infrastructure 40 of the Operating System 60 of the Serving Device 10 to encrypt and transmit, using encrypted communication protocols (such as, but not limited to, secure sockets layer (SSL), transport layer security (TLS), virtual private network (VPN), etc.), the Computer File and/or Program 110 and its associated permissions and/or rights to the Client Device 11. Then the Operating System 60 of the Serving Device 10 recalls the Computer File and/or Program 110 from Storage 100; places an electronic copy of the Computer File and/or Program 110 into RAM 80; and encrypts and transmits the Computer File and/or Program 110 to the Client Device 11 via the Communication Means 120. Then the Public Key Infrastructure 41 of the Operating System 61 of the Client Device 11 receives and decrypts from transmission, using encrypted communication protocols (such as, but not limited to, secure sockets layer (SSL), transport layer security (TLS), virtual private network (VPN), etc.), said Computer File and/or Program 110 and places an electronic copy of said Computer File and/or Program 110 into RAM 81. Then the Controlling Client Software and/or Firmware 31 automatically instructs the Encrypting File System 51 of the Client Device 11 to encrypt and save said electronic copy of the Computer File and/or Program 110 from RAM 81 to Storage 101, using the associated permissions and/or rights transmitted by the Serving Device 10, and to then erase any electronic copies of the Computer File and/or Program 110 from RAM 81. Then the Controlling Client Software and/or Firmware 31 of the Operating System 61 of the Client Device 11 instructs the Operating System 61 of the Client Device 11 to reestablish user intervention.

The user of the Client Device 11 may use the Computer File and/or Program 110 saved in Storage 101, subject to the permissions and/or rights associated therewith, as if said Computer File and/or Program 110 were not encrypted. Copies or moves of the Computer File and/or Program 110 which are not executed by the Encrypting File System 51, will not be properly encrypted for use on a computing device other than the Client Device 11. In accordance with said permissions and/or rights, the user of the Client Device 11 may utilize the Controlling Client Software and/or Firmware 31 to activate functionality of the Encrypting File System 51 to execute a move or copy of the Computer File and/or Program 110 from Storage 101 to Storage 102 of a Next Client Device 12. The Transceiver 72 of the Client Device 12 is connected to a Communication Means 120. The user of the Client Device 11 views a window (such as, but not limited to, as used by the Windows 2000 operating system) of the Client Interface 21 and the Next Client Interface 22, which displays the relevant contents of Storage 101 to Storage 102, respectively, on the video display of the Client Device 11. The user identifies the object (such as, but not limited to, icon) (hereinafter "icon") associated with the Computer File and/or Program 110 to be moved from Storage 101 to Storage 102. The user of the Client Device 11 uses their computer mouse to move the icon (such as, but not limited to, a graphical user interface drag-n-drop move) associated with the Computer File and/or Program 110 from the Client Interface 21 window to the Next Client Interface 22 window. The drag-n-drop of said icon associated with said Computer File and/or Program 110 initiates a series of automated actions by the Controlling Serving Software and/or Firmware 30 then by the Controlling Client Software and/or Firmware 31. First, the Controlling Client Software and/or Firmware 31 instructs the Operating System 61 of the Client Device 11 to temporarily suspend user intervention to prevent any form of unauthorized data or instruction input into or throughout the Client Device 11 or the Next Client Device 12 by a means or mechanism internal or external to either the Client Device 11 or the Next Client Device 12, such as, but not limited to, user input or control through use of a keyboard, mouse or other physical means or mechanism; a computer program; macro; or any other means or mechanism which could in any way affect the functionality of the software and/or firmware of the present invention which could in any way affect the functionality of any software and/or firmware utilized by the present invention, and to prevent any form of unauthorized access to, use of, control over the Computer File and/or Program during execution of the transmission request. Then the Controlling Client Software and/or Firmware 31 instructs the Controlling Client Software and/or Firmware 32 to instruct the Operating System 62 of the Next Client Device 12 to temporarily suspend user intervention (such as, but not limited to, keyboard or mouse intervention, program or macro instructions, etc.) during execution of the transmission request. Then the Controlling Client Software and/or Firmware 32 instructs the Operating System 62 of the Next Client Device 12 to temporarily suspend user intervention. Then the Controlling Client Software and/or Firmware 32 instructs the Controlling Client Software and/or Firmware 31 to transmit said Computer File and/or Program 110 to the Next Client Device 12. Then the Controlling Client Software and/or Firmware 31 instructs the Encrypting File System 51 to recall and decrypt said Computer File and/or Program 110, and its associated permissions and/or rights, from Storage 101 and to save an electronic copy thereof in RAM 81. Then the Controlling Client Software and/or Firmware 31 instructs the Public Key Infrastructure 41 of the Operating System 61 of the Client Device 11 to encrypt and transmit the electronic copy of said Computer File and/or Program 110 from RAM 81, and its associated permissions and/or rights, to the Next Client Device 12 via Communication Means 120. Then the Controlling Client Software and/or Firmware 32 instructs the Public Key Infrastructure 42 of the Next Client Device 12 to receive and decrypt from transmission said Computer File and/or Program 110, and its associated permissions and/or rights, and place an electronic copy thereof in RAM 82. In the case of a move of said Computer File and/or Program 110 from Storage 101 to Storage 102, upon receipt of the Computer File and/or Program 110 into RAM 82 by the Next Client Device 12, the Controlling Client Software and/or Firmware 32 of the Next Client Device 12 automatically instructs the Controlling Client Software and/or Firmware 31 of the Client Device 11 to instruct the Operating System 61 of the Client Device 11 to delete all copies of the Computer File and/or Program 110 in Storage 101 or RAM 81. Then the Controlling Client Software and/or Firmware 31 instructs the Operating System 61 to reestablish user intervention of the Client Device 11. Then the Controlling Client Software and/or Firmware 32 automatically instructs the Encrypting File System 52 of the Operating System 62 of the Next Client Device 12 to encrypt and save to Storage 102 said electronic copy of the Computer File and/or Program 110 from RAM 82, using the associated permissions and/or rights transmitted from the Client Device 11, and then erase all electronic copies of the Computer File and/or Program 110 from RAM 82. Then the Controlling Client Software and/or Firmware 32 instructs the Operating System 62 to reestablish user intervention of the Next Client Device 12.

The user of the Next Client Device 12 may, subject to the permissions and/or rights originally established and transmitted by the Serving Device 10 to the Client Device 11 and then to the Next Client Device 12, use the Computer File and/or Program 110 as if the Computer File and/or Program 110 were not encrypted. Copies or moves of the Computer File and/or Program 110 which are not executed by the Encrypting File System 52 of the Next Client Device 12, in conjunction with the Controlling Client Software and/or Firmware 32 of the Next Client Device 12, will not be properly encrypted for use on a computing device other than the Next Client Device 12.

As example, a user of the Serving Device 10 connects the Transceiver 70 of the Serving Device 10 to a Communication Means 120 with a subsequent communications connection to the Internet. The user of the Serving Device 10 saves an audio file (such as, but not limited to, in MP3 format), being a Computer Program and/or File 110, in Storage 100 and assign it a link (such as, but not limited to, a TCP and/or IP hyperlink) to a Serving Interface 20 (such as, but not limited to, a web page). The user of the Client Device 11 connects the Transceiver 71 of the Client Device 11 to a Communication Means 120 with a subsequent communications connection to the Internet. The user of the Client Device 11 is able to view a copy of the Serving Interface 20 within the Client Interface 21 on the video display of the Client Device 11. The user of the Client Device 11 selects the MP3 audio file for download to the Client Device 11 by using its computer mouse to double click on the hyperlink associated with the MP3 audio file which is displayed on the Client Interface 21 on the video display of the Client Device 11. The double click action instructs the Client Interface 21 to transmit an electronic request, via Communication Means 120, to download the MP3 audio file from the Serving Device 10 to the Client Device 11. Upon receipt of the transmission request, the Serving Interface signals the Controlling Serving Software and/or Firmware 30 to commence various automatic functions. The Controlling Serving Software and/or Firmware 30 firsts instructs (via Communication Means 120) the Controlling Client Software and/or Firmware 31 to instruct the Operating System 61 of the Client Device 11 to temporarily suspend user intervention. The Controlling Client Software and/or Firmware 31 then instructs (via Communication Means 120) the Controlling Serving Software and/or Firmware 30 to transmit the MP3 audio file. The Controlling Serving Software and/or Firmware 30 instructs the Operating System 60 to recall the MP3 audio file, and its associated permissions and/or rights, from Storage 100 and place an electronic copy thereof in Random Access Memory 80. Then the Controlling Serving Software and/or Firmware 30 instructs the Public Key Infrastructure 40 to encrypt and transmit an electronic copy of the MP3 audio file, and its associated permissions and/or rights, to the Client Device 11 via the Communication Means 120. At this point, the Controlling Serving Software and/or Firmware 30 has concluded its portion of the transmission process and the program related to the Controlling Serving Software and/or Firmware 30 terminates. Upon receipt of the MP3 audio file, and its associated permissions and/or rights, by the Client Device 11, the Public Key Infrastructure 41 decrypts the MP3 audio file and its associated permissions and/or rights from transmission and stores an electronic copy thereof in Random Access Memory 81. Then the Controlling Client Software and/or Firmware 31 instructs the Encrypting File System 51 of the Client Device 11 to encrypt and save said electronic copy of the MP3 audio file from Random Access Memory 81 to Storage 101, using the associated permissions and/or rights transmitted by the Serving Device 10. Then the Controlling Client Software and/or Firmware 31 instructs and instructs the Encrypting File System 51 or the Operating System 61 to erase any electronic copies of the MP3 audio file from Random Access Memory 81. Then the Controlling Client Software and/or Firmware 31 of the Operating System 61 of the Client Device 11 instructs the Operating System 61 of the Client Device 11 to reestablish user intervention. At this point, the Controlling Client Software and/or Firmware 31 has concluded its portion of the transmission and encryption for storage process and the program related to the Controlling Client Software and/or Firmware 31 terminates. The user of the Client Device 11 is now able to play the MP3 audio file and the Encrypting File System 51, subject to the permissions and/or rights used by the Encrypting File System 51 to encrypt the MP3 audio file.

Furthermore, the user of the Client Device 11 then decides to transfer the MP3 audio file to Next Client Device 12, and in this example, the user can do so based on the permissions and/or rights associated with the MP3 audio file. The user of the Client Device 11 connects the Transceiver 71 of the Client Device 11 to a Communication Means 120 with a subsequent communications connection to the Internet. The user of the Next Client Device 12 connects the Transceiver 72 of the Next Client Device 12 to a Communication Means 120 with a subsequent communications connection to the Internet. The user of the Client Device 11 views the Client Interface 21 and a copy of the Next Client Interface 22 on the video display of the Client Device 11, which displays the relevant contents of Storage 101 and Storage 102, respectively. The user identifies the object (such as, but not limited to, icon) (hereinafter "icon") associated with the MP3 audio file to be moved from Storage 101 to Storage 102. The user of the Client Device 11 uses its computer mouse to move the icon (such as, but not limited to, a graphical user interface drag-n-drop move) associated with the MP3 audio file from the Client Interface 21 window to the Next Client Interface 22 window. The drag-n-drop of said icon associated with the MP3 audio file initiates a series of automated actions by the Controlling Client Software and/or Firmware 31 then by the Controlling Client Software and/or Firmware 32. First, the Controlling Client Software and/or Firmware 31 instructs the Operating System 61 of the Client Device 11 to temporarily suspend user intervention (such as, but not limited to, keyboard or mouse intervention, program or macro instructions, etc.) during execution of the transmission request. Then the Controlling Client Software and/or Firmware 31 instructs the Controlling Client Software and/or Firmware 32 to instruct the Operating System 62 of the Next Client Device 12 to temporarily suspend user intervention (such as, but not limited to, keyboard or mouse intervention, program or macro instructions, etc.) during execution of the transmission request. Then the Controlling Client Software and/or Firmware 32 instructs the Operating System 62 of the Next Client Device 12 to temporarily suspend user intervention. Then the Controlling Client Software and/or Firmware 32 instructs the Controlling Client Software and/or Firmware 31 to transmit the MP3 audio file to the Next Client Device 12. Then the Controlling Client Software and/or Firmware 31 recalls the permissions and/or rights associated with the MP3 audio file and used by the Encrypting File System 51 and instructs the Encrypting File System 51 to recall and decrypt the MP3 audio file from Storage 101 and save an electronic copy thereof in Random Access Memory 81. Then the Controlling Client Software and/or Firmware 31 instructs the Public Key Infrastructure 41 of the Operating System 61 of the Client Device 11 to encrypt and transmit the electronic copy of the MP3 audio file from Random Access Memory 81, and its associated permissions and/or rights, to the Next Client Device 12 via Communication Means 120. Then the Controlling Client Software and/or Firmware 32 instructs the Public Key Infrastructure 42 of the Next Client Device 12 to receive and decrypt from transmission the MP3 audio file, and its associated permissions and/or rights, and place an electronic copy thereof in Random Access Memory 82. In the case of a move of the MP3 audio file from Storage 101 to Storage 102, upon receipt of the MP3 audio file into Random Access Memory 82 by the Next Client Device 12, the Controlling Client Software and/or Firmware 32 of the Next Client Device 12 automatically instructs the Controlling Client Software and/or Firmware 31 of the Client Device 11 to instruct the Operating System 61 and/or the Encrypting File System 51 of the Client Device 11 to delete all copies of the MP3 audio file in Storage 101 or Random Access Memory 81. Then the Controlling Client Software and/or Firmware 31 instructs the Operating System 61 to reestablish user intervention of the Client Device 11. Then the Controlling Client Software and/or Firmware 32 automatically instructs the Encrypting File System 52 of the Operating System 62 of the Next Client Device 12 to encrypt and save to Storage 102 said electronic copy of the MP3 audio file from Random Access Memory 82, using the associated permissions and/or rights transmitted from the Client Device 11, and then erase all electronic copies of the MP3 audio file from Random Access Memory 82. Then the Controlling Client Software and/or Firmware 32 instructs the Operating System 62 to reestablish user intervention of the Next Client Device 12. At this point, the Controlling Client Software and/or Firmware 32 has concluded its portion of the transmission and encryption for storage process and the program related to the Controlling Client Software and/or Firmware 32 terminates. The user of the Next Client Device 12 is now able to play the MP3 audio file, however, in this example the user of the Client Device 11 is not able to play the MP3 audio file because the file was "moved" and during the "move" process, all copies of the MP3 audio file were erased from the Client Device 11 upon conclusion of the "move" process. Additionally, since the MP3 audio file has been encrypted by the Encrypting File System 51 for use on the Next Client Device 12, traditional moves or duplications of the MP3 audio file will not be authorized by the Encrypting File System 51 and only moves or duplications of the MP3 audio file utilizing the Controlling Client Software and/or Firmware 32 will be authorized by the Encrypting File System 51.

"Means or mechanism" herein refers to 35 U.S.C. Section 112, paragraph 6. The term "means" of "means or mechanism" is subject to 35 U.S.C. Section 112, paragraph 6, while the term "mechanism" of "means or mechanism" is not subject to 35 U.S.C. Section 112, paragraph 6.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A client device for manipulating an encrypted computer file or program received through a network from a serving device separate, apart and distinct from the client device comprising:
 a processor;
 a network interface in communication with the network which receives commands from the serving device through the network;
 a receiver which receives the commands from the network interface and provides the commands to the processor;
 RAM;
 storage having the computer file or program received through the network from the serving device in a memory;
 an encrypting file system and wherein the commands are encrypted, and the encrypting file system decrypts the commands, the commands include automated commands which suspend user intervention and commands which reestablish user intervention, wherein the processor, based on the commands, makes changes to the computer file or program in the memory, suspends user intervention to the computer file or program while the computer file or program is in the RAM, decrypts the encrypted computer file or program after it is received by the receiver and places it into the RAM, encrypts the decrypted computer program or file from the RAM, transfers the encrypted computer program or file from the RAM to the memory, saves the encrypted computer file or program from the RAM to the memory, reestablishes user intervention to the computer file or program and deletes the computer file or program from the RAM after the computer file or program has been transferred from the RAM to the memory to prevent unauthorized use or replication of the computer file or program, the computer file or program has permissions and rights which identifies what the processor can do with the computer file or program, the permissions include moving and copying the computer file or program, the rights include number of user and expiration dates of rights of assignment of permissions and rights to third parties of the computer file or program.

2. The device as described in claim 1 wherein the commands include the permissions or rights that are encrypted, said encrypting file system decrypts the encrypted permissions or rights.

3. The device as described in claim 2 including a mechanism for requesting a computer file or program through the network interface.

4. The device as described in claim 3 wherein the storage has controlling software or firmware which causes the processor to encrypt the computer file or program and the permissions or rights for storage.

5. The device as described in claim 4 including an operating system and the controlling software or firmware instructs the operating system to reestablish user intervention at a desired time.

6. The device as described in claim 5 including a public-key infrastructure which decrypts from transmission the permissions or rights and the encrypted computer file or program using encrypted communication protocols.

7. The device as described in claim 6 wherein the controlling software or firmware moves or copies the encrypted computer files or program to the network interface for transmission.

8. A method for manipulating an encrypted computer file or program received through a network from a serving device separate, apart and distinct from the client device comprising the steps of:
receiving encrypted commands at a network interface of a client device through a network from a serving device separate, apart and distinct from the client device, the commands include commands which suspend user intervention and commands which reestablish user intervention, said network interface receiving the commands which suspend user intervention and commands which reestablish user intervention;
receiving the commands at a receiver of the client device from the network interface;
decrypting the commands with an encrypting file system of the client device;
providing the commands to a processor of the client device from the receiver, and
making changes to the computer file or program in memory of storage of the client device, temporarily suspending user intervention to the computer file or program while the computer file or program is in RAM, decrypting the encrypted computer file or program after it is received by the receiver and placing it into the RAM, encrypting the decrypted computer program or file from the RAM, transferring the encrypted computer program or file that has been decrypted to the memory, saving the encrypted computer file or program from the RAM to the memory by the processor based on the commands to prevent unauthorized use or replication of the computer file or program and deleting the computer file or program from the RAM after the computer file or program has been transferred from the RAM to the memory to prevent unauthorized use or replication of the computer file or program and reestablishes user intervention to the computer file or program, the computer file or program has permissions or rights which identifies what the processor can do with the computer file or program, the permissions include moving and copying the computer file or program, the rights include number of user and expiration dates of rights of assignment of permissions and rights to third parties of the computer file or program.

9. The method as described in claim 8 including the step of said processor decrypting the encrypted permissions or rights with the encrypting file system.

10. The method as described in claim 9 including the step of the processor requesting a computer file or program through the network interface.

11. The method as described in claim 10 including the step of controlling software or firmware of the device encrypting the computer file or program and the permissions or rights for storage in the device.

12. The method as described in claim 11 including the step of the controlling software or firmware instructing an operating system of the device to reestablish user intervention at a desired time.

13. The method as described in claim 12 wherein the decrypting step includes the step of decrypting with a public-key infrastructure of the device the permissions or rights and the encrypted computer file or program using encrypted communication protocols.

14. The method as described in claim 13 including the step of the controlling software or firmware transmitting a copy of the encrypted computer file or program and permissions or rights from the network interface.

* * * * *